US010083517B2

(12) United States Patent
Harvill

(10) Patent No.: US 10,083,517 B2
(45) **Date of Patent: *Sep. 25, 2018**

(54) SEGMENTATION OF AN IMAGE BASED ON COLOR AND COLOR DIFFERENCES

(71) Applicant: ZAZZLE INC., Redwood City, CA (US)

(72) Inventor: Young Harvill, El Granada, CA (US)

(73) Assignee: Zazzle Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/902,931

(22) Filed: Feb. 22, 2018

(65) Prior Publication Data

US 2018/0182104 A1 Jun. 28, 2018

Related U.S. Application Data

(63) Continuation of application No. 15/388,163, filed on Dec. 22, 2016, now Pat. No. 9,905,012, which is a (Continued)

(51) Int. Cl.

*G06K 9/34* (2006.01)
*G06T 7/11* (2017.01)

(Continued)

(52) U.S. Cl.

CPC .............. *G06T 7/11* (2017.01); *G06K 9/4652* (2013.01); *G06Q 30/06* (2013.01);

(Continued)

(58) Field of Classification Search

CPC ... G06Q 30/0621; G06T 7/408; G06T 7/0081; G06T 11/001; G06T 2207/10024;

(Continued)

(56) References Cited

U.S. PATENT DOCUMENTS 5,039,132 A 8/1991 Anderson
5,084,727 A 1/1992 Maronian (Continued)

OTHER PUBLICATIONS

U.S. Appl. No. 14/623,445, filed Feb. 16, 2015, Office Action, dated Apr. 8, 2016.

(Continued)

*Primary Examiner* — Ali Bayat

(74) *Attorney, Agent, or Firm* — Hickman Palermo Becker Bingham LLP; Malgorzata A. Kulczycka

(57) ABSTRACT

An input image is partitioned into a plurality of image regions based on color and color differences. The partitioning comprises assigning a color difference value to plurality of locations within the input image. The partitioning further comprises assigning each of the plurality of locations to an image region of the plurality of image regions, where the assigning occurs according to a particular order. The particular order is based at least in part on color difference values associated with the plurality of locations. The input image may comprise markup. Data representing at least a particular portion of the markup in the input image based on the partitioning is identified. Data representing at least the portion of the markup may be used in a visualization of a customizable product or a manufacturing control associated with a customizable product.

18 Claims, 13 Drawing Sheets

104

102

Related U.S. Application Data continuation of application No. 14/623,445, filed on Feb. 16, 2015, now Pat. No. 9,530,217, which is a continuation of application No. 14/203,961, filed on Mar. 11, 2014, now Pat. No. 8,958,633, which is a continuation of application No. 14/050,281, filed on Oct. 9, 2013, now Pat. No. 8,712,566.

(60) Provisional application No. 61/785,533, filed on Mar. 14, 2013, provisional application No. 61/787,532, filed on Mar. 15, 2013.

(51) Int. Cl.

| | |
|---|---|
| ***G06K 9/46*** | (2006.01) |
| ***G06T 7/40*** | (2017.01) |
| ***G06Q 30/06*** | (2012.01) |
| ***G06T 11/00*** | (2006.01) |
| ***G06T 7/70*** | (2017.01) |
| ***G06T 7/90*** | (2017.01) |
| ***G06T 7/187*** | (2017.01) |

(52) U.S. Cl.

CPC ..... *G06Q 30/0621* (2013.01); *G06Q 30/0643* (2013.01); *G06T 7/187* (2017.01); *G06T 7/40* (2013.01); *G06T 7/70* (2017.01); *G06T 7/90* (2017.01); *G06T 11/001* (2013.01); *G06T 2207/10004* (2013.01); *G06T 2207/10024* (2013.01)

(58) Field of Classification Search

CPC ........... G06T 2207/10004; G06T 2207/20141; G06K 9/4652

See application file for complete search history.

(56) References Cited

U.S. PATENT DOCUMENTS

| | | | |
|---|---|---|---|
| 5,615,123 A | 3/1997 | Davidson et al. | |
| 5,764,308 A | 6/1998 | Lee | |
| 5,778,091 A | 7/1998 | Shibazaki | |
| 6,608,700 B1 | 8/2003 | Mantell | |
| 7,262,778 B1 | 8/2007 | Edwards et al. | |
| 7,438,232 B2 * | 10/2008 | Uchiyama | G06K 19/06037 235/462.01 |
| 8,023,746 B2 | 9/2011 | Ackley et al. | |
| 8,184,124 B2 | 5/2012 | Edwards et al. | |
| 8,320,607 B2 * | 11/2012 | Yamaguchi | G06T 1/0028 382/100 |
| 8,515,171 B2 * | 8/2013 | Vantaram | G06T 7/11 382/164 |
| 8,913,074 B2 | 12/2014 | Levin | |
| 8,958,633 B2 | 2/2015 | Harvill | |
| 2002/0068141 A1 | 6/2002 | Pieper et al. | |
| 2002/0191861 A1 | 12/2002 | Cheatle | |
| 2003/0182402 A1 * | 9/2003 | Goodman | H04N 1/00132 709/220 |
| 2004/0169892 A1 | 9/2004 | Yoda | |
| 2009/0034011 A1 * | 2/2009 | Shindo | H04N 1/60 358/3.28 |
| 2009/0080688 A1 * | 3/2009 | Au | G06T 1/0028 382/100 |
| 2009/0080773 A1 | 3/2009 | Shaw et al. | |
| 2010/0085372 A1 | 4/2010 | Levin | |
| 2011/0013837 A1 | 1/2011 | Bergman | |
| 2014/0233852 A1 | 8/2014 | Lee | |
| 2014/0270506 A1 | 9/2014 | Harvill et al. | |
| 2015/0262371 A1 | 9/2015 | Harvill et al. | |

OTHER PUBLICATIONS

U.S. Appl. No. 14/623,445, filed Feb. 16, 2015, Notice of Allowance, dated Aug. 19, 2016.

U.S. Appl. No. 14/203,961, filed Mar. 11, 2014, Notice of Allowance, dated Sep. 2, 2014.

U.S. Appl. No. 14/203,961, filed Mar. 11, 2014, Supplemental Notice of Allowance, dated Dec. 24, 2014.

U.S. Appl. No. 14/203,961, filed Mar. 11, 2014, Supplemental Notice of Allowability, dated Nov. 26, 2014.

U.S. Appl. No. 14/203,961, filed Mar. 11, 2014, Supplemental Notice of Allowability, dated Oct. 29, 2014.

U.S. Appl. No. 14/203,961, filed Mar. 11, 2014, Office Action, dated May 7, 2014.

U.S. Appl. No. 14/050,281, filed Oct. 9, 2013, Notice of Allowance, dated Dec. 13, 2013.

Tremeau et al., "A Region Growing and Merging Algotithm to Color Segementation" Pattern Recognition, Elsevier, vol. 30, No. 7, dated Jul. 1, 1997, 13 pages.

Hilsmann Anna et al., "Tracking and Retexturing Cloth for Real-Time Virtual Clothing Applications", dated May 4, 2009, 12 pages.

European Patent Office, "Search Report" in application No. 14159664. 3-1906, dated Oct. 1, 2014, 7 pages.

Claims in European Application No. 1415966.3-1906, dated Oct. 2014, 4 pages.

9.T Jos B.T.M. Roerdink , Arnold Meijster,"The Watershed Transform: Definitions, Algorithms and Parallelization Strategies" Fundamenta Informaticae vol. 41 pp. 187-228 2001.

8.Shengcai Peng; Lixu Gu; , "A Novel Implementation of Watershed Transform Using Multi-Degree Immersion Simulation," Engineering in Medicine and Biology Society, 2005.

7.Yuqian Zhao; Jianxin Liu; Huifen Li; Guiyuan Li; , "Improved watershed algorithm for dowels image segmentation," Intelligent Control and Automation, 2008.

6.Yanmin Peng; Rong Liu; , "Object segmentation based on watershed and graph cut," Image and Signal Processing (CISP), 2010 3rd International Congress on , vol. 3, No., pp. 1431-1435, Oct. 16-18, 2010.

5.S. Beucher and C. Lantutejoul, "Use of watersheds in contour detection," in Proc. Int. Workshop Image Processing, Real-Time Edge and Motion Detection/Estimation, Rennes, France, Sep. 17-21, 1979.

4.Feng Jing; Mingjing Li; Hong-Jiang Zhang; Bo Zhang; , "Unsupervised image segmentation using local homogeneity analysis," Circuits and Systems, 2003. ISCAS '03. Proceedings of the 2003.

3.S. Ji, H.W. Park, Image segmentation of color image based on region coherency, IEEE International Conference on Image Processing, 1998, pp. 80}83.

2.L. Vincent and P. Soille, "Watersheds in Digital Spaces: An Efficient Algorithm Based on Immersion Simulations," IEEE Trans. on PAMI. vol. 13, No. 6. Jun. 1991.

11.Sheng Chen; Zhanfeng Shen; Jiancheng Lu; Lijing Gao, "A Fast Watershed-based Image Segmentation Algorithm Using Local Merging Strategy," IEEE (Jan. 21, 2008).

10.Claude Kauffman; Nicolas Piche, "A Cellular Automaton for Ultra-Fast Watershed Transform on GPU," ICPR, p. 1-4. IEEE, (2008).

1.H.D. Cheng, X.H. Jiang, Y. Sun, J. Wang (2001). "Color image segmentation: advances and prospects". Pattern Recognion. vol. 34, No. 12, pp. 2259-2281.

* cited by examiner

Camera(s) 202
Image Processing System 204
Raw Images 206
Customization Image Rendering Asset Generation Instructions 208
Markup Region Identification Instructions 210
Web Server 212
Customization Image Rendering Asset 214
Web Page Generator 216
Network 218
User System 220

| 4 | 4 | 6 | 6 | 4 |
|---|---|---|---|---|
| 2 | 6 | 6 | 4 | 6 |
| 6 | 1 | 6 | 6 | 4 |
| 6 | 6 | 6 | 6 | 6 |
| 4 | 4 | 4 | 4 | 6 |

| 12 |
|---|
| 7 |
| 0 |
| 24 |
| 27 |

| 2 | 0 | 7 | 1 | 7 | 0 | 3 | 3 | 6 | 2 |
|---|---|---|---|---|---|---|---|---|---|
| 2 | 0 | 4 | 4 | 4 | 7 | 6 | 5 | 6 | 8 |
| 2 | 10 | 1 | 0 | 1 | 11 | 6 | 13 | 4 | 9 |
| 3 | 14 | 3 | 16 | 3 | 17 | 3 | 18 | 4 | 19 |
| 3 | 15 | 3 | 21 | 3 | 22 | 3 | 23 | 3 | 20 |

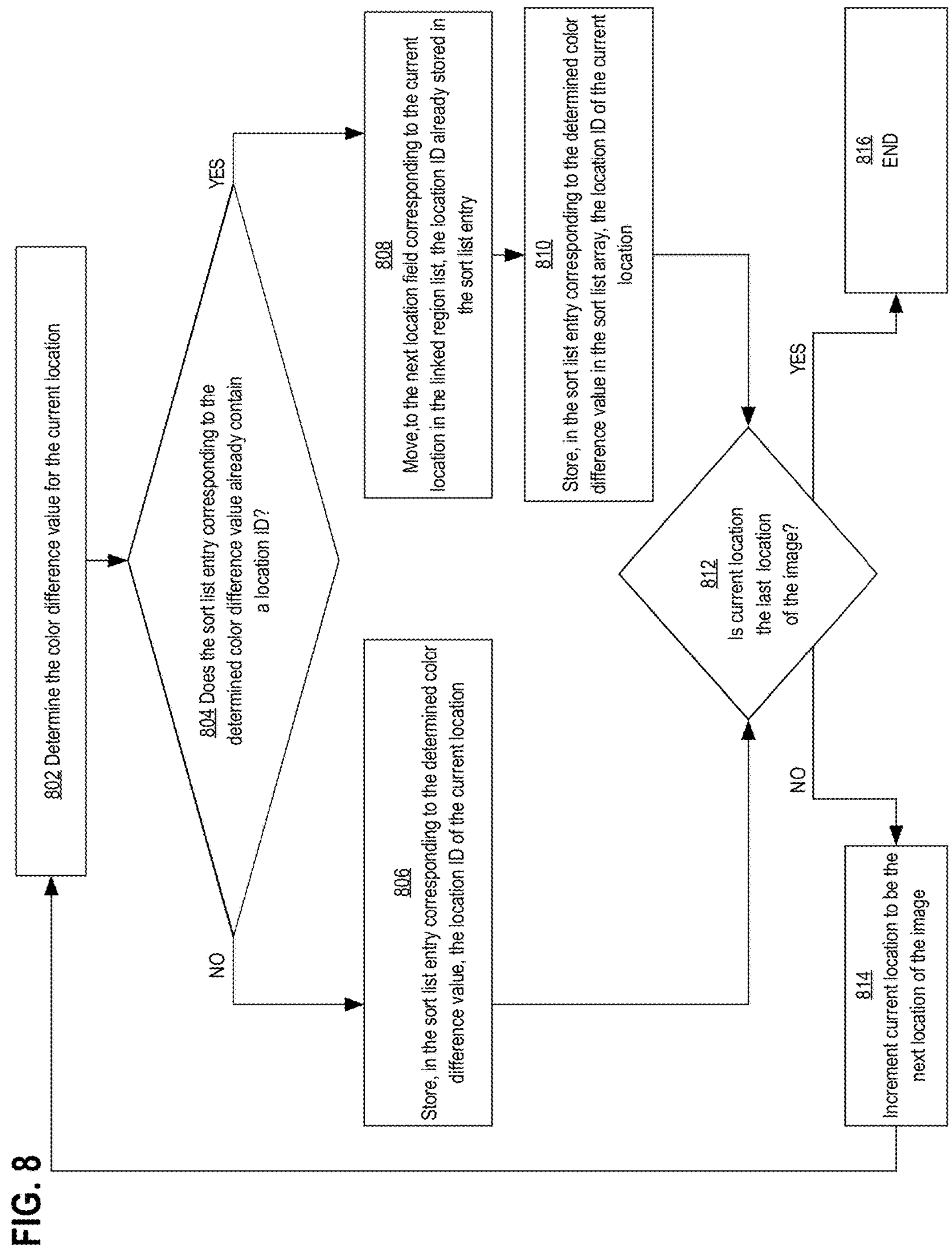
FIG. 8
802 Determine the color difference value for the current location
804 Does the sort list entry corresponding to the determined color difference value already contain a location ID?
YES
NO
808
Move,to the next location field corresponding to the current location in the linked region list, the location ID already stored in the sort list entry
810
Store, in the sort list entry corresponding to the determined color difference value in the sort list array, the location ID of the current location
806
Store, in the sort list entry corresponding to the determined color difference value, the location ID of the current location
812
Is current location the last location of the image?
YES
NO
816
END
814
Increment current location to be the next location of the image

FIG. 9

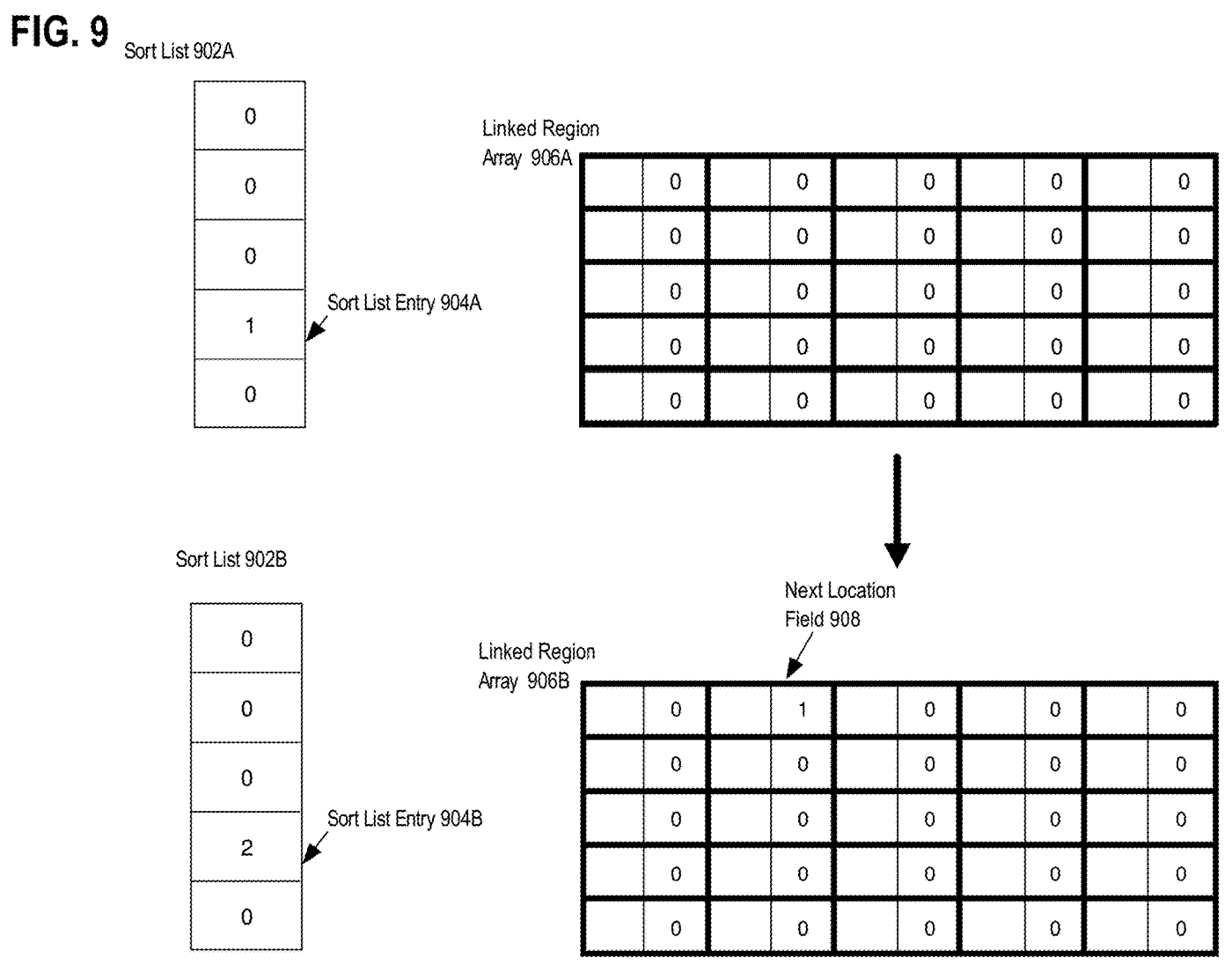

Sort List 902A

Sort List Entry 904A

Linked Region Array 906A

Sort List 902B

Sort List Entry 904B

Linked Region Array 906B

Next Location Field 908

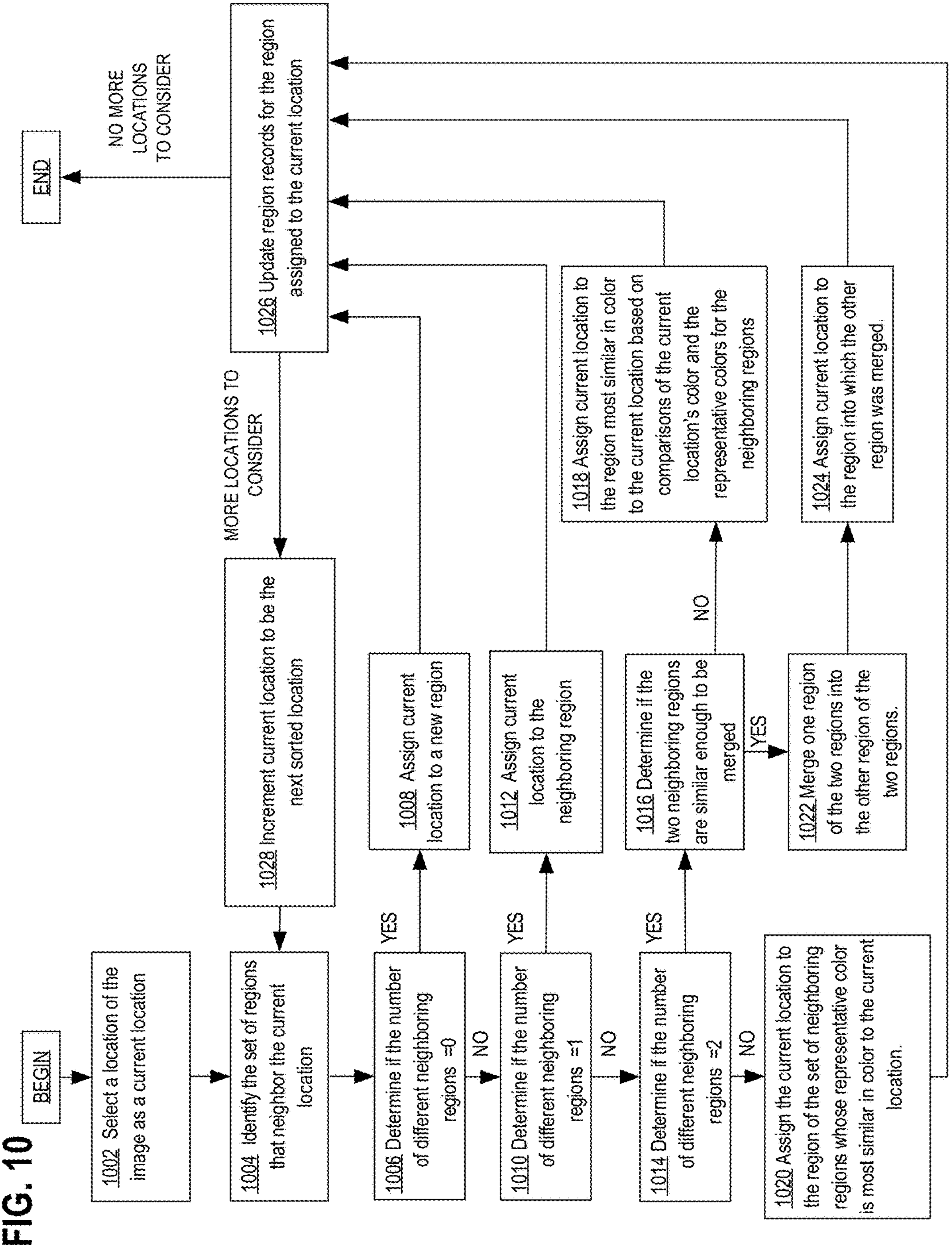
FIG. 10
BEGIN
1002 Select a location of the image as a current location
1004 Identify the set of regions that neighbor the current location
1006 Determine if the number of different neighboring regions =0
YES
NO
1008 Assign current location to a new region
1010 Determine if the number of different neighboring regions =1
1012 Assign current location to the neighboring region
1014 Determine if the number of different neighboring regions =2
1016 Determine if the two neighboring regions are similar enough to be merged
1018 Assign current location to the region most similar in color to the current location based on comparisons of the current location's color and the representative colors for the neighboring regions
1020 Assign the current location to the region of the set of neighboring regions whose representative color is most similar in color to the current location.
1022 Merge one region of the two regions into the other region of the two regions.
1024 Assign current location to the region into which the other region was merged.
1026 Update region records for the region assigned to the current location
1028 Increment current location to be the next sorted location
MORE LOCATIONS TO CONSIDER
NO MORE LOCATIONS TO CONSIDER
END SERVER 1330
INTERNET
ISP
1328
1326
LOCAL NETWORK 1322
HOST 1324
NETWORK LINK
1320
1300
STORAGE DEVICE 1310
ROM 1308
MAIN MEMORY 1306
BUS 1302
COMMUNICATION INTERFACE 1318
PROCESSOR 1304
DISPLAY 1312
INPUT DEVICE 1314
CURSOR CONTROL 1316

SEGMENTATION OF AN IMAGE BASED ON COLOR AND COLOR DIFFERENCES

BENEFIT CLAIM

This application claims the benefit under 35 U.S.C. § 120 as a continuation of application Ser. No. 15/388,163, filed Dec. 22, 2016, which claims the benefit of issued U.S. Pat. No. 9,530,217 B2, issued on Dec. 27, 2016, which claim the benefit of issued U.S. Pat. No. 8,958,633 B2, issued on Feb. 17, 2015 which claims the benefit of application Ser. No. 14/050,281, filed Oct. 9, 2013, which claims the benefit under 35 U.S.C. 119 of application 61/785,533, filed Mar. 14, 2013, and application 61/787,532, filed Mar. 15, 2013, the entire contents of which are hereby incorporated by reference herein for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure relates to techniques for segmenting a product markup image into regions based on colors and differences between colors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Information about a digital image, such as the location and shape of particular objects in the digital image, may be extracted by performing segmentation upon the digital image. Image segmentation is a process for partitioning the digital image into a plurality of different regions. For example, a manufacturer or provider of a custom product, such as Zazzle, Inc., may wish to extract the location and shape of markup imprinted on a product for purposes of understanding the geometry of the custom product, such as a clothing item or accessory, when worn.

One approach for image segmentation is to transform the full-color representation of an image into a monochrome luminance image where the shade of each of pixel represents the luminance value of the pixel in the original image. Region partitions may be determined based on the luminance of pixels within the image. However, such an approach often produces inaccurate results since some of the color information necessary to determine accurate region partitions is lost in the transformation to the monochrome luminance image. Approaches for improved recognition of image partitions in images of marked up products are needed.

SUMMARY OF THE INVENTION

The appended claims may serve as a summary of the invention.

BRIEF DESCRIPTION OF THE DRAWINGS

In the drawings:

FIG. 8 illustrates an example process for sorting image locations based on color difference values.

FIG. 9 illustrates the contents of a partially-populated sort list and linked region array which may be populated based on the color difference values stored in a color difference array according to the process illustrated by FIG. 7.

FIG. 10 illustrates an example process for assigning image locations to regions. The process may be performed by image processing system 204.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1. General Overview
2. Structural and Functional Overview
 2.1 Example Customization Image Rendering System
 2.2 Example Region Information Utilization Processes
 2.3 Example Markup Image Partitioning Process
 2.4 Alternatives and Extensions
3. Implementation Mechanisms—Hardware Overview
4. Example Partitioning Instructions 1. General Overview Techniques for segmentation of a product markup image based on color and color differences are described. Readers of the present disclosure are presumed to have knowledge and understanding of U.S. application Ser. No. 13/736,844. In an embodiment, the product markup image is an image of a customizable product comprising markup. The product image may be partitioned into different regions based in part on color differences. In particular, each location of the product markup image input image may be assigned a color difference value indicating how different the location is from neighboring locations in terms of color. Each location may be assigned an image region of the plurality of image regions and locations may be considered for region assignments according to an order that is based, at least in part, on the color difference value assigned to the pixel. For example, locations with low associated color difference values may be assigned regions before locations with high associated color difference values.

An image processing system may utilize the determined region information in visualization of the customizable product or a manufacturing control associated with the customizable product. For example, the image processing system may determine the position of particular markup portions based on the region information. Based on the determined position information, the image processing system may determine a customization image rendering asset, which comprises instructions for rendering computer-generated visualization of customized products. The region information may also be utilized to verify the quality of a customized product after the customized product has been manufactured.

Figure 1:
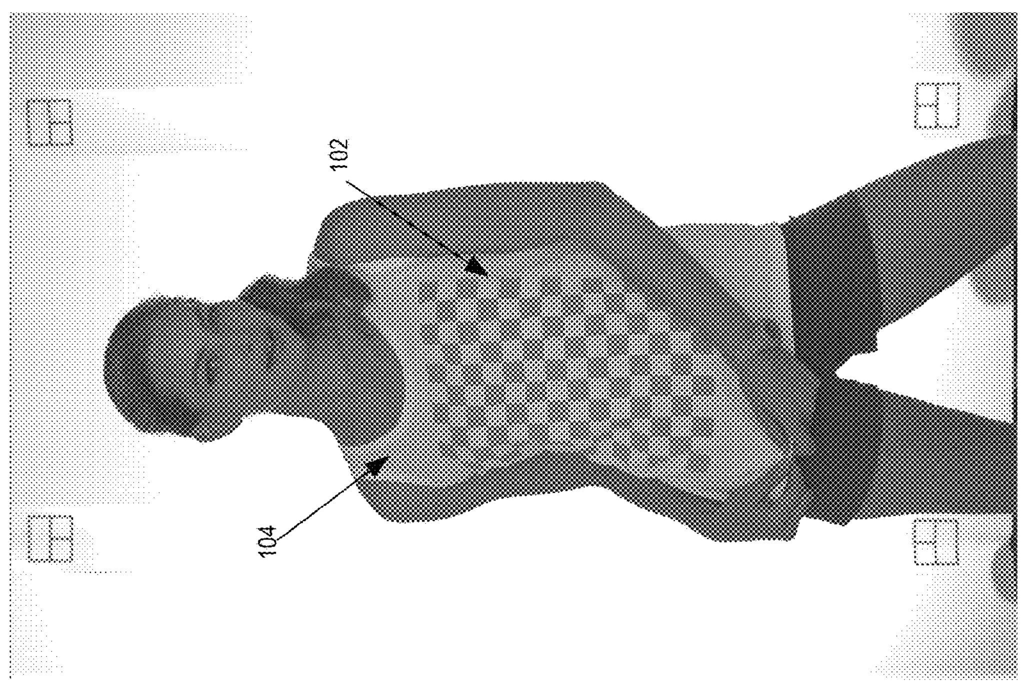
FIG. 1 illustrates an example input image that may be partitioned into a plurality of image regions.

2. Structural and Functional Overview 2.1 Example Region Information Utilization Systems FIG. 1 illustrates an example input image that may be partitioned into a plurality of image regions. Shirt 104 is a customizable product upon which custom text or image may be imprinted. Markup 102 is a two-color checkerboard pattern comprised of solid-colored squares, where each square is of a single color and each adjacent square is of the opposite color. The processes described herein may partition at least the markup portion of the input image into a set of regions, where each region of the set of regions represents a single corresponding square of the markup. In other embodiments, the markup may comprise different pattern(s), shape(s), or color(s).

The image partitioning process may result in regions information that identifies, for example, for each found region, the image locations that belong to the region, the area of each region, and/or the representative color of the region. In some embodiments, each image location is a separate pixel. In other embodiments, each image location is a group of pixels.

Figure 2:
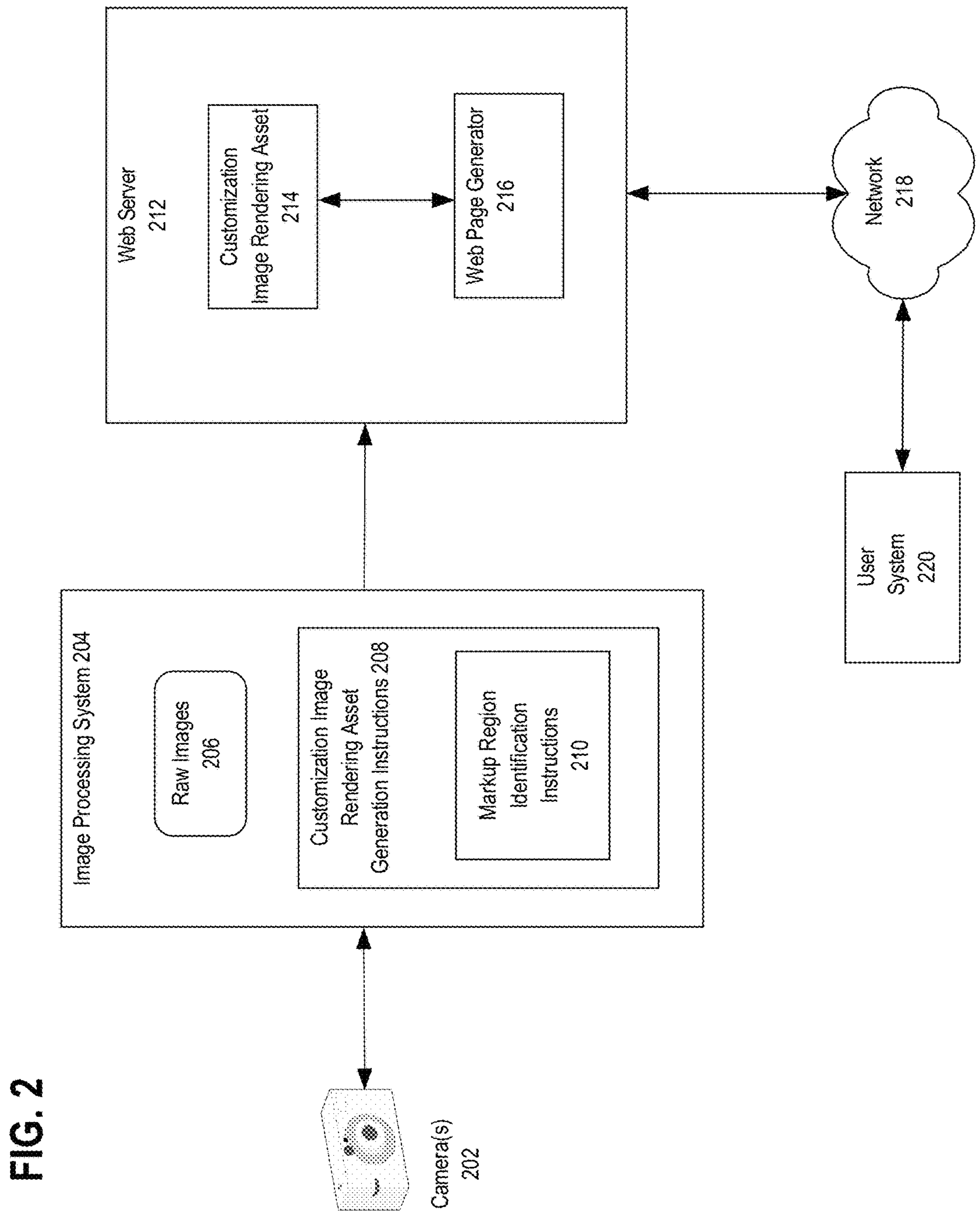
FIG. 2 illustrates an example customization image rendering system which may utilize region information determined according to the partitioning process.

In an embodiment, the resulting region information is utilized in the automatic visualization of a custom product, which may be customized according to customer-provided parameters. FIG. 2 illustrates an example customization image generation and rendering system which may utilize the region information determined according to the partitioning process.

One or more cameras 202 may capture a photograph of the customizable product imprinted or otherwise embellished with the markup. Image processing system 204 may receive and store raw digital images 206 received from camera(s) 202. Image processing system 204 comprises customized image rendering asset generation instructions 208, which may be implemented as one or more stored computer programs, scripts, or other software elements. One or more processors of image processing system 204 may execute the customized image rendering asset generation instructions 208 to cause the generation of customization image rendering instructions. Customized image rendering asset generation instructions 208 may comprise markup region identification instructions 210, which include instructions for analyzing input images to identify partitioned image regions and collect information about the image regions, such as a representative color of the region, the area of the region, and the set of image locations included in the region. The generation of customize image rendering asset instructions may comprise determining instructions for generating a customization image rendering based on the region information. The customization image rendering asset may contain instructions for rendering a computer-generated customization image that visualizes a customized product.

Image processing system 204 may send a generated customized image rendering asset to web server 212, such as customization image render asset 214 to be stored and used at web server 212. Web server 212 may receive and store one or more customization image rendering assets, such as the customization image rendering asset 214. Web server 212 also comprises web page generator 216, which determines HTML and/or other web page content. Web server 212 may receive requests for web pages from a user system, such as user system 220. In response, web server 212 may send a web page for display at the user system, and may include a customization image that is generated by the execution of instructions included within the customization image rendering asset. Web server 212 may be operated by an on-line retailer for the generation of online retail web sites.

User system 220 may be the system by which a customer browses the website of an online retailer, selects a product to customize, specifies how the product is to be customized, and receives the customization image. User system 220 may request web pages and web content form web server 212 via network 28, which may be the World Wide Web (WWW).

The system illustrated in FIG. 2 is merely an example of customization image rendering system. Systems of other embodiments may not include each of the components and sub-components illustrated in FIG. 2. Further, for the purpose of clearly illustrating an example, FIG. 2 shows individual instances of various functional elements as described above; however, in various embodiments, each functional element may be implemented as one or more local or distributed computers, processes, software elements or other logic.

2.2 Example Region Information Utilization Process

Figure 3:
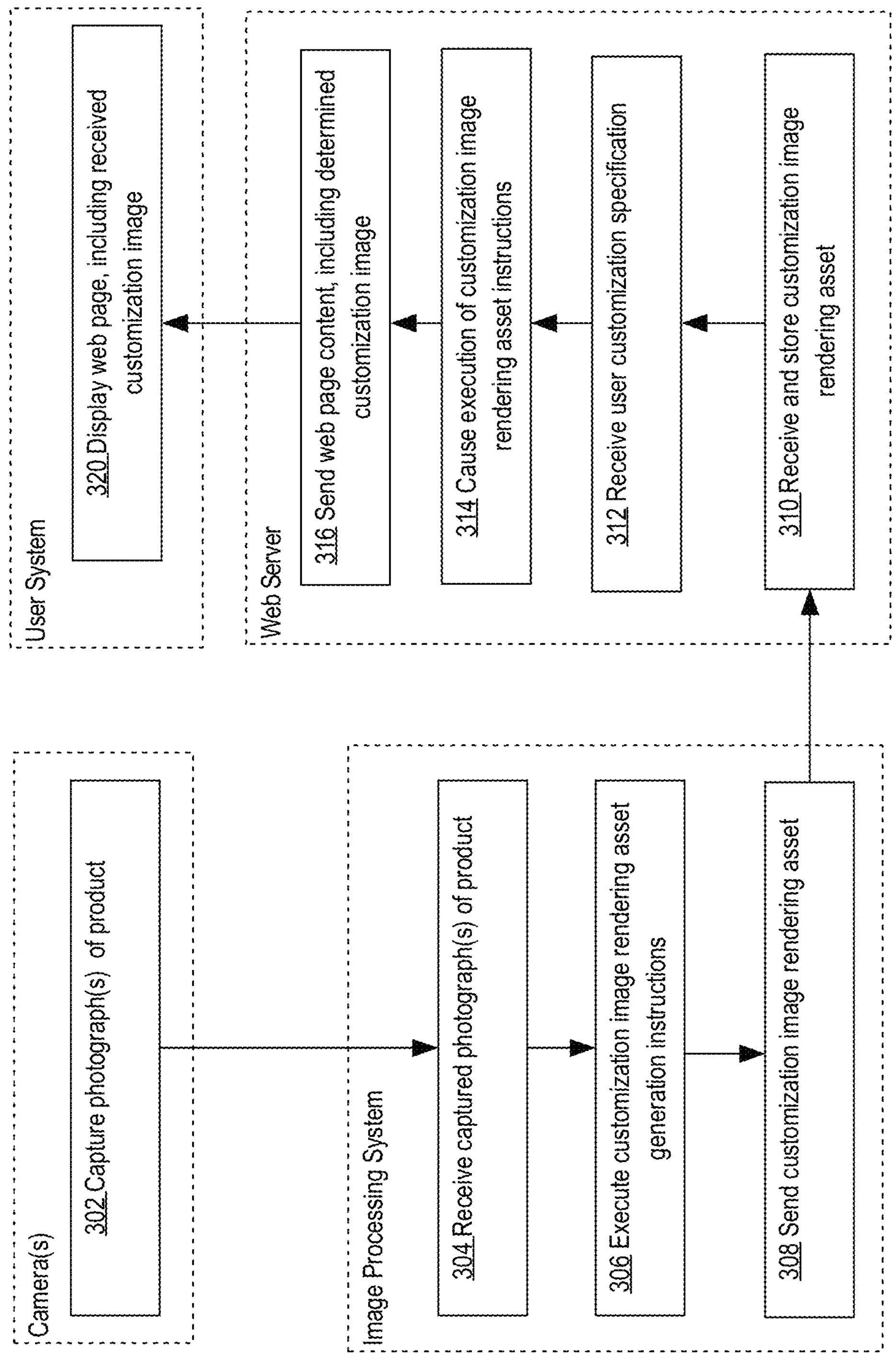
FIG. 3 illustrates an example process that may be implemented on a customization image rendering system, such as the customization image rendering system illustrated in FIG. 2.

FIG. 3 illustrates an example process that may be implemented on a customization image rendering system, such as the customization image rendering system illustrated in FIG. 2. According to the process of FIG. 3, a customization image rendering asset, which contains instructions for the generation of a customization image, is determined based in part on region information determined according to the partitioning process. The process of FIG. 3 may be performed by image processing system 204.

At block 302, photograph(s) of a product are captured. The photographed product maybe visibly imprinted or otherwise embellished with markup. In some embodiments, the product being photographed is modeled by a person or animal. The photograph(s) may be captured at one or more cameras such as camera(s) 102. At block 304, a photograph collection and processing system, such as image processing system 204 of FIG. 2, receives the captured photograph(s) of the product. At block 306, customization image rendering asset generation instructions are executed at the photograph collection and processing system. The execution of the customization image rendering asset generation instructions cause the generation of a customization image rendering asset.

At block 308, the customization image rendering asset is sent to the web server. Multiple products may be photographed individually, and a different customization image rendering asset may be created for each of the multiple products at the photograph collection and processing system, and each of the customization image rendering assets may be sent to the web server.

At block 310, the customization image rendering assets are received and stored at a web server, such as web server 112. The web server may store various customization image rendering assets. At block 312, the web server receives a customer customization specification. The customer may have provided the specification by interacting with a graphical interface presented within a web page viewed at a user system. The user customization specification may include a user-specified design for imprinting on the customizable product, customization location information specifying where a particular customization is to be located, a color for a detail area of the product such as a trim color, a color for the entire product, and other customization specification information.

At block 314, the instructions of a particular customization image rendering asset are executed. The web server may store a customization image rendering asset for each customizable product. The web server may automatically select a particular customization image rendering asset for execution of its instructions based on the received customization specification. For example, the web server may select a particular customization image rendering asset that corresponds to a particular customizable product in response to determining that the customer selected to customize the particular customizable product. Information provided by the user, and included in the received user customization specification may be used to automatically determine inputs for the customization image rendering asset. For example, a customer may select a particular shirt color and the selected color, or a color curve corresponding to the selected color, may be provided as an input to the customization image rendering asset instructions when the instructions of the customization image rendering asset are executed. Executing the instructions of the customization image rendering asset results in a customization image that depicts the customer-selected product as customized according to the customer's specifications.

At block 316, the web server sends web page content to the user system that provided the customization specifications, which may be user system 120. The web page content includes a customization image determined as a result of executing the instructions of the customization image rendering asset, or a modified version of such an image. At block 320, a web page that includes the received customization image is displayed at the user system.

FIG. 3 illustrates merely one example process that may be implemented on a customization image rendering system. In other embodiments, different steps may be performed, the ordering of steps may be changed, certain steps may not occur, or additional steps may occur in addition to the steps illustrated in FIG. 3.

Figure 4:
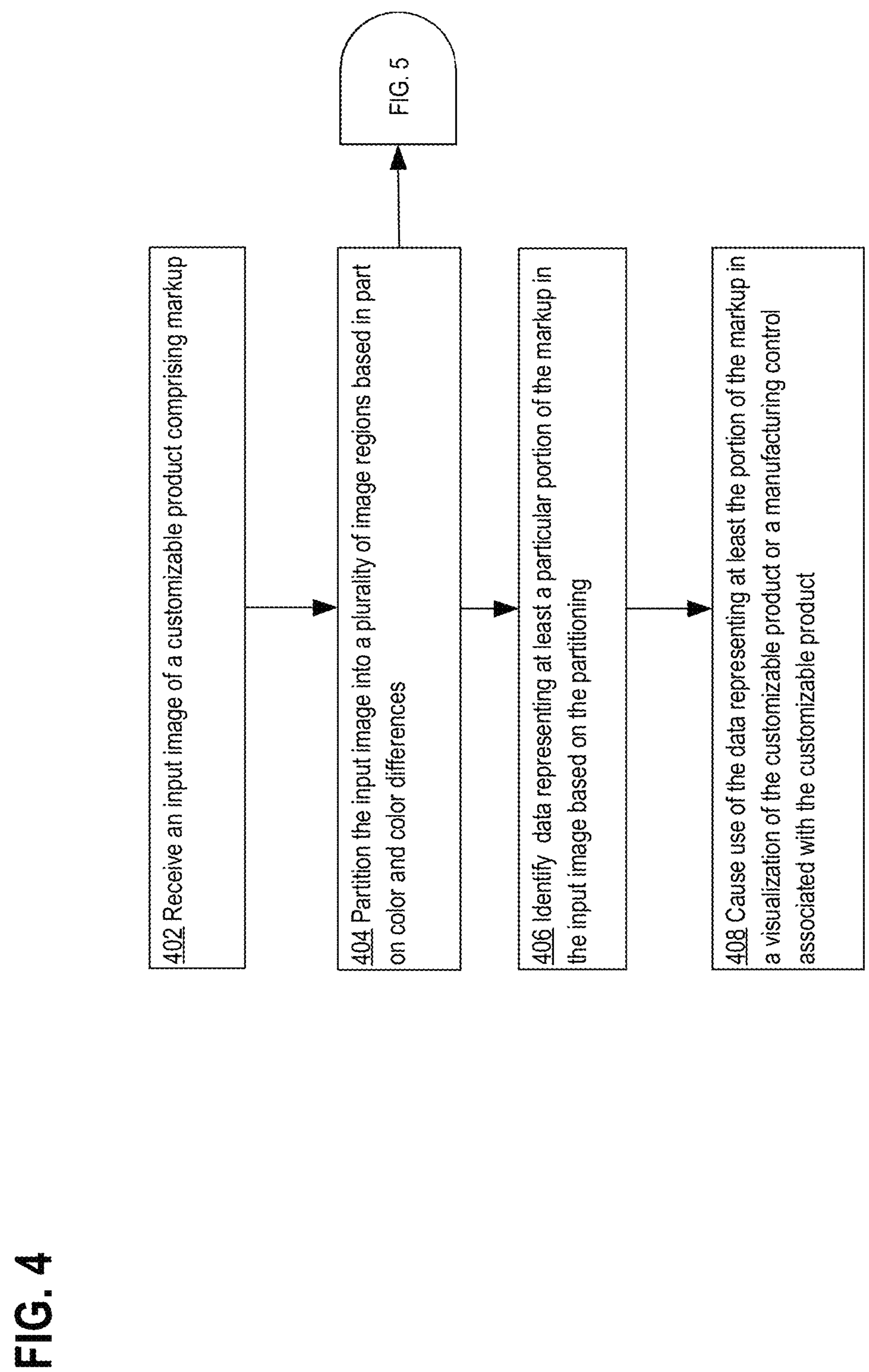
FIG. 4 illustrates an example process for partitioning an image into regions and utilizing the region information that may be determined as a result of the partitioning process.

FIG. 4 illustrates an example process for utilizing the region information that may be determined as a result of the partitioning process in the visualization of a customizable product. The process of FIG. 4 may be performed by image processing system 204. At block 402, an input image of a customizable product comprising markup is received. Image processing system 204 may modify the input image before beginning the partitioning process for improved segmentation. For example, image processing system 204 may remove luminance information from the input image before the partitioning.

Figure 5:
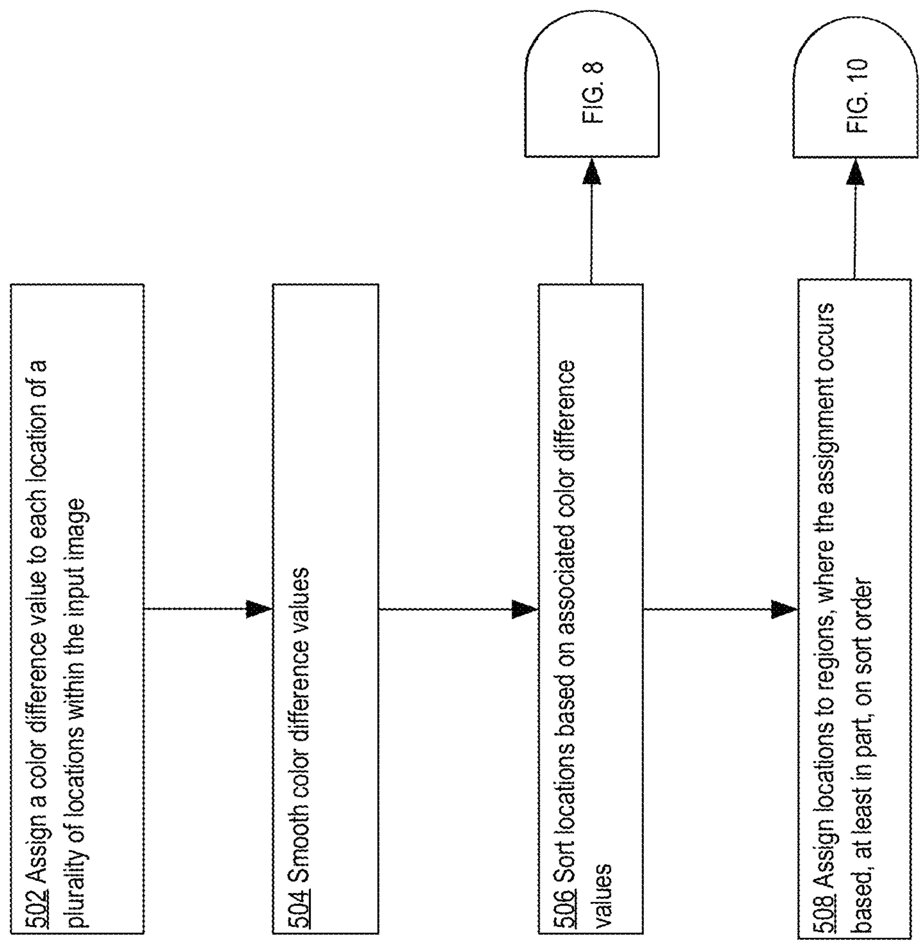
FIG. 5 illustrates an example process for partitioning an input image into a plurality of image regions based in part on color and color differences.

At block 404, the input image is partitioned into a plurality of image regions based in part on color and color differences. FIG. 5 illustrates an example process for partitioning an input image into a plurality of image regions based in part on color and color differences.

Figure 11:
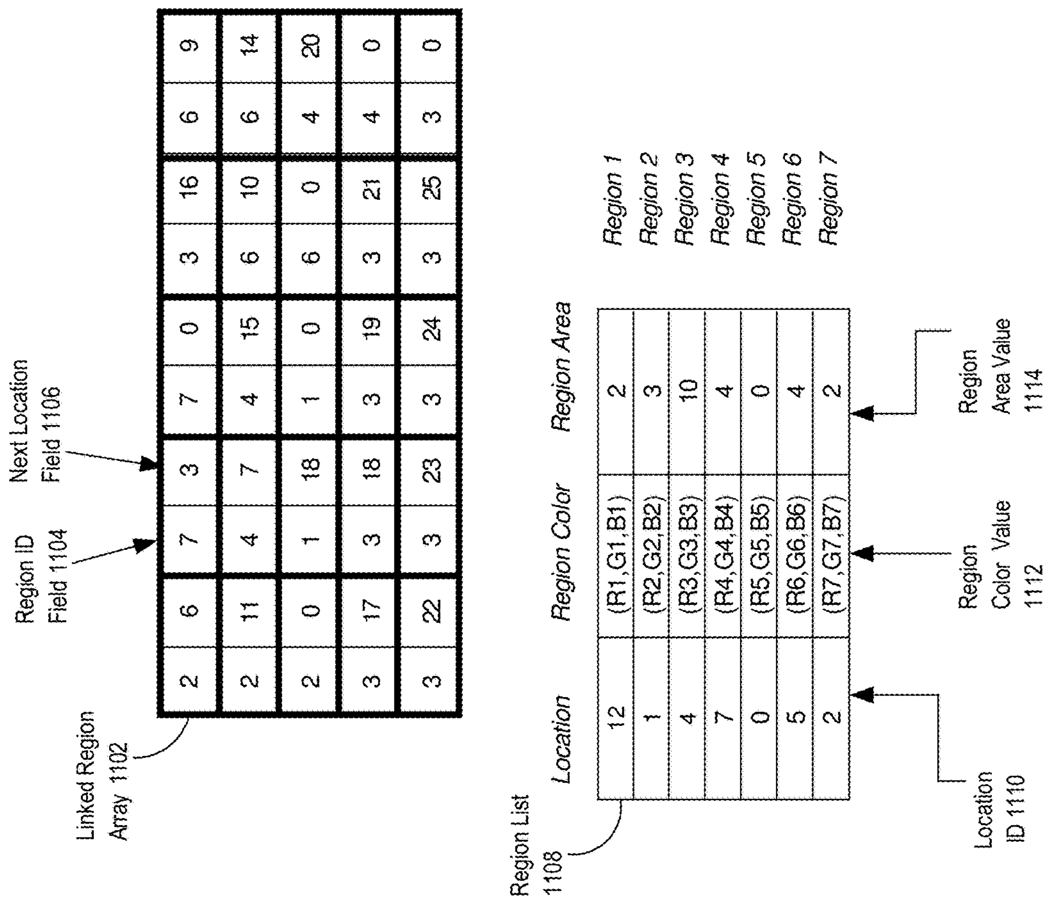
FIG. 11 illustrates example region information that may be determined as a result of the partitioning process.

FIG. 11 illustrates example region information that may be determined as a result of the partitioning process. Region list 1108 includes region records for each determined region. For each region, region list 1108 identifies an image location that has been assigned to the region, i.e. location ID 1110, a representative color for the image region, which may be an average color of the region or the color of the first location assigned to the region, i.e. region color value 1112, and an area of the region, i.e. region area value 1114. According to different embodiments, the region records may include additional or different types of information such as the number of locations included in the region which are edge locations that are located on the edge of a region. The ID corresponding to a particular region may be determined based on the location of the entry corresponding to the particular region in the region list. For example, the first entry of region list 1108 may correspond to the region identified by a region ID of "1."

Region list 1108 may be any of a plurality of data structures including, but not limited to, a linked list, array, or an array of linked lists.

Linked region array 1102 illustrates an example final form of the linked region array according to one embodiment. For each linked region array entry of linked region array 1102, the region ID field may identify the region assigned to the location corresponding to the linked region array entry and the next location field may identify a next location of the input image which has been assigned to the same region as the location corresponding to the linked region array entry. For example, region ID field 1104 corresponds to the second location of the input image and the value contained in region ID field 1104, "7," indicates that the second location of the input image has been assigned to region 7. Next location field 1106 also corresponds to the second location of the input image and the value contained in next location field 1106, "3," indicates that the third location of the input image has also been assigned to the same region as the second location of the input image.

At block 406, data representing at least a particular portion of the markup in the input image is identified based on the partitioning. The data representing the portions of the markup may be the set of image locations that are within the particular portion of the markup. The data may be determined based on the determined region information, such as linked region array 1002 and region list 1008.

Image processing system 204 may identify the particular image regions that correspond to the particular portion based on region record information contained in region list 1008. For example, if the markup is a checkerboard pattern of yellow and purple, image processing system 204 may efficiently locate all yellow portions of the markup by identifying all regions whose region color is similar to yellow, and then identifying the locations which have been assigned to those regions. Image processing system 204 may identify all regions whose region color value is similar to yellow by calculating a color difference value for each region represented in a region list, where the color difference value for the region indicates how different the region's representative color, as indicated in region list 1008, is from the color yellow. Each of the regions whose corresponding color difference value is less than a threshold amount may be identified as a yellow region and each location belonging to that region may be determined to be yellow.

The entire set of image locations belonging to a particular region may be efficiently determined by looking up the location ID of the first location in the corresponding location ID field of the region list 1008 and the remaining locations may be determined by traversing the next location fields of linked region array 1002, beginning with the next location field corresponding to the location identified by the location ID contained region list 1008. For example, each of the locations belonging to region 7 may be determined by looking up location ID 1010 in region list 1008, whose value is "2." The next location belonging to region 7 may be determined by looking up the next location field corresponding to the second image location, next location field 1006, which contains the value "3." The next location belonging to region 7 may be determined by looking up the next location field corresponding to the third image location, next location field 1006, which contains the value "0." In an embodiment a value such as "0" may be used to indicate that there are no further image locations belonging to the region.

The data representing at least the particular portion may indicate other information, such as the color of the particular portion of the markup pattern in the input image. For example, once image processing system 204 determines the location(s) of the input image that belong to the particular portion of the markup, image processing system 204 may access the original input image to determine color information for the determined locations.

At block 408, use of the data representing at least the portion of the markup in a visualization of the customizable product or a manufacturing control associated with the customizable product is caused. Causing use of the data representing at least the portion of the markup in a visualization of the customizable product may comprise determining a customization image rendering asset comprising instructions for the rendering of a customization image based on the data, where the customization image rendering asset may be sent to a web server for subsequent use by the web server. Causing use of the data representing at least the portion of the markup in a visualization of the customizable product may also comprise determining a customization image based on the data.

In an embodiment, customization image rendering asset 214 renders a customization images that visualize a customized product as it would appear in when in use, with natural contouring and shape. For example, the coloring and/or shape of the customized product in the customization image may depict the folds or natural contours that occur when the customized product is worn by a model. Image processing system 204 may determine a customization image rendering asset which generates such customization images based on an analysis of an input image such as the input image depicted in FIG. 1.

Image processing system 204 may utilize the region information determined by the partitioning process to determine how the particular portion of the input image differ with regards to color or location from the same particular portions of a sample reference image depicting the same markup. For example, the lines of each square of markup 102 may appear straight and parallel to each other in the sample reference image, whereas they appear slanted and disjoined in some areas of the input image, such as at areas where the customizable product is twisted or folded. The sample reference image may depict the same markup depicted in the input image, except as a flat image. Image processing system 204 may map locations in the sample reference image to locations in the input image and compare how the position and color of the two locations differ in the two images. Image processing system 204 may generate customization image rendering asset 214 based on an analysis of how the input image and sample reference image differ.

Customization image rendering asset 214 may render the customization image based on a flat customization-specification image depicting the customization to be applied to a customizable product. The customization-specification may be a customer-uploaded image, design, or text that is to be imprinted on the customizable product. Customization image rendering asset 214 may generate the customization image in part by modifying the customization-specification image to depict the folds and contours as depicted in the input image.

Figure 12:
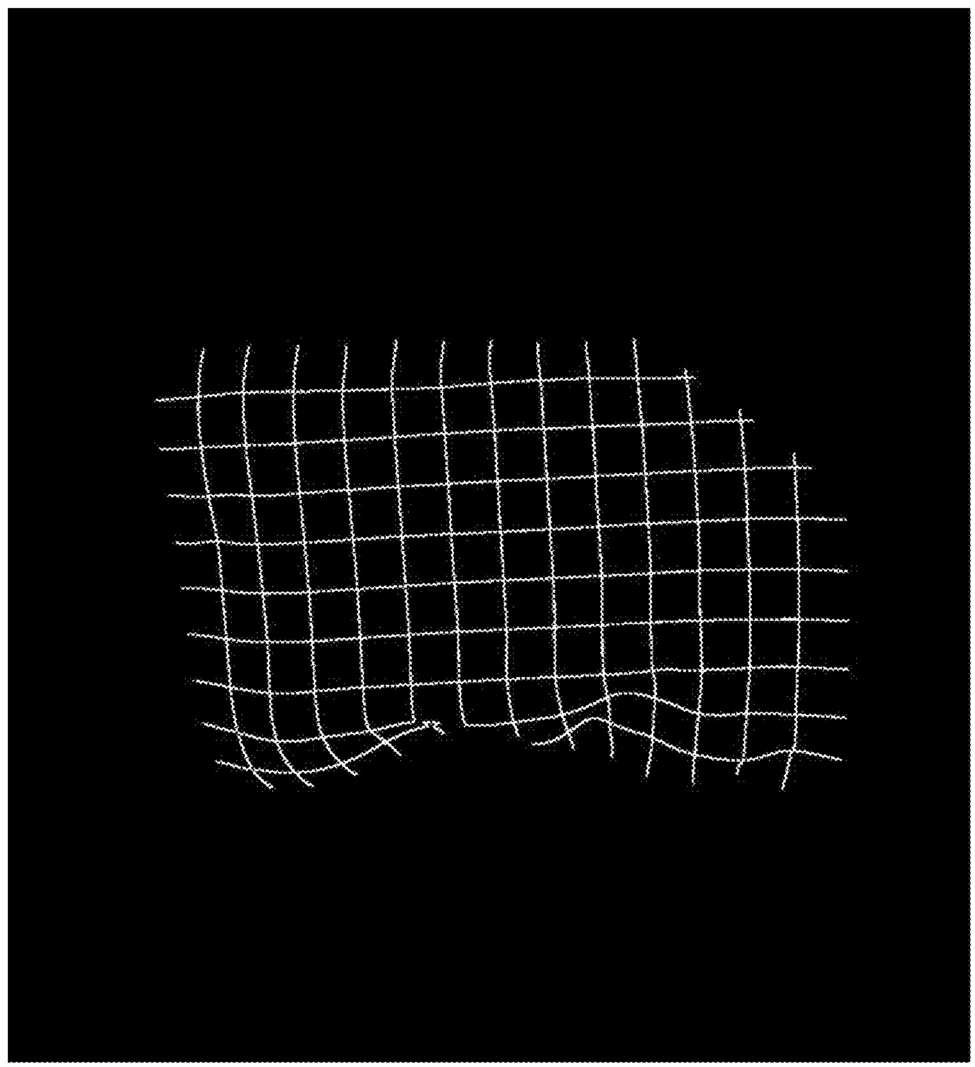
FIG. 12 depicts a markup grid image that may be determined based in part on the region information identified by partitioning the input image depicted in FIG. 1.

In an embodiment, image processing system 204 determines a markup grid image based on the region information, where the markup grid image identifies the edges between different markup portions. For example, image processing system 204 may determine a markup grid image based in part on the region information identified by partitioning an input image. FIG. 12 depicts a markup grid image that may be determined based in part on the region information identified by partitioning the input image depicted in FIG. 1. Image processing system 204 may determine customization image rendering asset 214 based in part on the markup grid image.

Example processes for utilizing a markup grid image to determine a customization image rendering asset may be further described in U.S. application Ser. Nos. 13/736,844, 13/342,103, 12/790,711 and U.S. Pat. Nos. 8,174,521, 8,175,931, 8,090,461, although other processes may be used in different embodiments. The contents of all patent applications and patents cited in this paragraph are hereby incorporated by reference in their entirety for all purposes as if fully set forth herein.

The lines of the markup grid may correspond to the shape of the borders between the squares in the markup of the color segmented image. The shapes of the lines in the markup grid indicate the geometry of the product in the design areas. For example, a slanted line may indicate that the product is slanted at the corresponding location. Such information may indicate how a customization design would appear when printed in the design region of a customized product. In an embodiment where there may be multiple design areas, design geometry information may be determined for each of the design areas. Although the markup grid image of FIG. 12 is illustrated as roughly parallel lines, in other embodiments, the markup grid image may be any of a variety of different shapes and/or patterns determined based on the markup. In an embodiment, a grid determined based upon a flat design image is mapped to a grid determined based upon the markup grid image to determine instructions to compare how various locations of the images differ in position and/or color in the two image.

The markup grid image of FIG. 12 may be analyzed to determine a customization image rendering asset. The customization image rendering asset may comprise instructions for rendering an image depicting a product customized according to user specifications. The user may provide a user image to be imprinted upon a product and the customization image rendering asset may depict how the product would appear with the image imprinted upon the product. The customization image generated by the customization image rendering asset may depict the same geometry and contours of the example input image. For example, the customization image may depict the shirt as being folded in the same location as depicted in the example input image.

FIG. 4 illustrates merely one example process of identifying and utilizing region information. In other embodiments, different steps may be performed, the ordering of steps may be changed, certain steps may not occur, or additional steps may occur in addition to the steps illustrated in FIG. 4.

In other embodiments, the determined region information may be utilized in the manufacturing control of a customized product. "Manufacturing" as used herein may refer to the imprinting of a particular customization on a pre-manufactured product. For example, the region information may be utilized to determine the location of a particular customization portion in the customized product and to ensure that that the color and position of the particular customization portion is within an expected range of colors and positions.

As another example, a provider of a custom product may provide customer-specified specifications for a custom product to a manufacturer who manufactures the customized product. When introducing a new product for custom imprinting, the manufacturer may specify an imprinting layout of their product, where the imprinting layout specifies the locations of the product upon which designs may be imprinted. For example, the manufacturer of a mobile phone case may specify that a particular region of the mobile phone case corresponding to a camera hole in the mobile phone case is a region at which a custom design may not be imprinted. The imprinting layout may specify that the region below the camera hole may be imprinted with a custom design.

In response to receiving the imprinting layout of the product from the manufacturer, the provider may send a mark-up image to the manufacturer for imprinting on the custom product. The manufacturer may imprint the mark-up image upon the product and send the customized product to the provider. The provider may visually examine the custom imprinted product to ensure that the imprinting of the custom design relative to the features of the product is visually appealing. The provider may make adjustments to the imprinting layout based on the examination. For example, a manufacturer may have failed to specify that a custom design may not be imprinted on a location of the mobile phone case corresponding to the camera hole. Upon receiving the custom imprinted product, a provider may determine that the placement of the design upon the mobile phone case is not visually appealing since a portion of the design is missing due to its location overlapping the camera hole. The provider may modify the size the design region to not cover the camera hole region or may shift the design region to a different location upon the phone. In an embodiment, the provider may propose an alternate imprinting layout to the manufacturer for review and approval by the manufacturer.

2.3 Example Markup Image Partitioning Process

FIG. 5 illustrates an example image partitioning process. The process of FIG. 5 may be performed by image processing system 204. At block 502, a color difference value is assigned to each location of a plurality of locations within the input image. In some embodiments, each location is a separate pixel of the input image and each pixel of the input image is assigned a color different value. A color difference value indicates how different the color of the corresponding location is from colors of neighboring locations.

In an embodiment, the color difference value for a particular location is determined based on a comparison of the color of the particular location and the color of locations that are distances of 2, 4, and 6 locations away. A color difference may value may be calculated for each distance and the three color values, each associated with a different distance, may be averaged to determine the final color difference value. Averaging the color difference values may comprise weighting color difference values associated with the greater distance more heavily than color difference values associated with the lesser distance. A color difference value may be calculated for a distance by determining how different an average of the colors of the different sampled locations of that distance is from the color of the center pixel. The color difference value for two locations may be calculated by calculating a dot product of the difference between the two colors.

Figure 6:
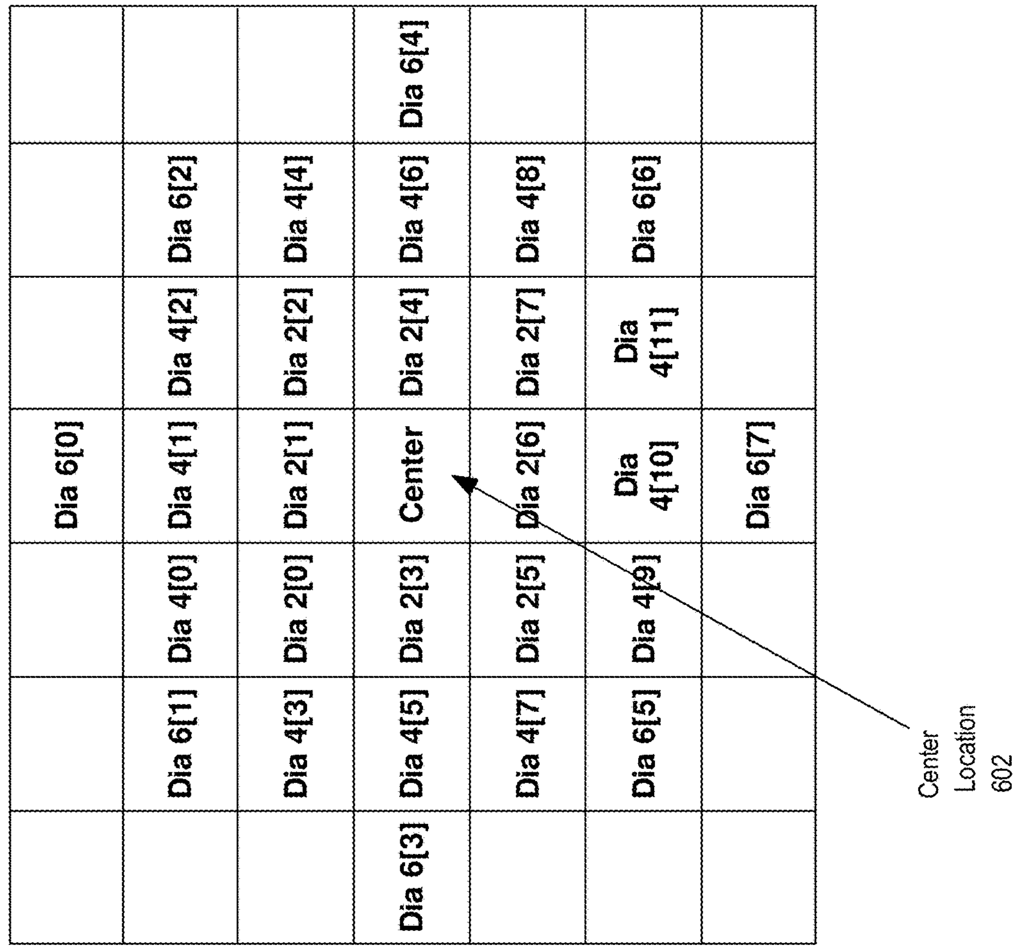
FIG. 6 illustrates an example diagram of location whose colors may be analyzed to determine a color difference value for a center location.

FIG. 6 illustrates an example diagram of location whose colors may be analyzed to determine a color difference value for a center location. In an embodiment, a color difference value for center location 602 is calculated using Equation 1:

Equation 1

$$ColorDiffVal_{Center} = \frac{1}{6}ColorDiff(Color_{Dia[2]\_Average}, Color_{Center}) + \frac{1}{3}ColorDiff(Color_{Dia[4]\_Average}, Color_{Center}) + \frac{1}{2}ColorDiff(Color_{Dia[6]\_Average}, Color_{Center})$$

$$Color_{Dia[2]\_Average} = \left(\frac{Color_{Dia\ 2[1]} + \ldots + Color_{Dia\ 2[7]}}{7}\right)$$

$$Color_{Dia[4]\_Average} = \left(\frac{Color_{Dia\ 4[1]} + \ldots + Color_{Dia\ 4[11]}}{11}\right)$$

$$Color_{Dia[6]\_Average} = \left(\frac{Color_{Dia\ 6[1]} + \ldots + Color_{Dia\ 6[7]}}{7}\right)$$

In other embodiments, determining color difference values may comprise sampling more or less locations, sampling locations at different distances, and/or assigning different weights to the determined color difference values.

At block 504, the color difference values are smoothed to decrease the variation between color difference values. In an embodiment, only relatively high and relatively low color difference values are modified to be, respectively, lower and higher. For example, only color difference values that are in the top 10 percent of highest color difference values or in the lowest 10 percent of color difference values may be modified. In an embodiment, a monochrome image is created based on the input image, where the color of each pixel represents the color difference value of the pixel. Smoothing the color difference values may comprise applying a Gaussian filter to the monochrome color difference value image. Smoothing color difference values before region assignment may prevent over-segmentation of the input image.

At block 506, locations are sorted based on their associated color difference values. The sorting may comprise grouping image locations into different groups based on their associated color difference values. FIG. 8 illustrates an example process for sorting image locations based on color difference values. At block 508, locations are assigned to regions, and the assignment of locations to regions occurs based, at least in part, on sort order. FIG. 10 illustrates an example process for assigning image locations to regions.

Image processing system 204 may analyze and partition a portion of an input image into regions or may analyze and partition an entire input image into a plurality of image regions. In an embodiment where image processing system 204 analyzes and partitions a portion of an input image into regions embodiment, color difference values and region assignments may only be determined for the locations within the portion of the input image region.

FIG. 5 illustrates merely one example image partitioning process. In other embodiments, different steps may be performed, the ordering of steps may be changed, certain steps may not occur, or additional steps may occur in addition to the steps illustrated in FIG. 5.

Figure 7:
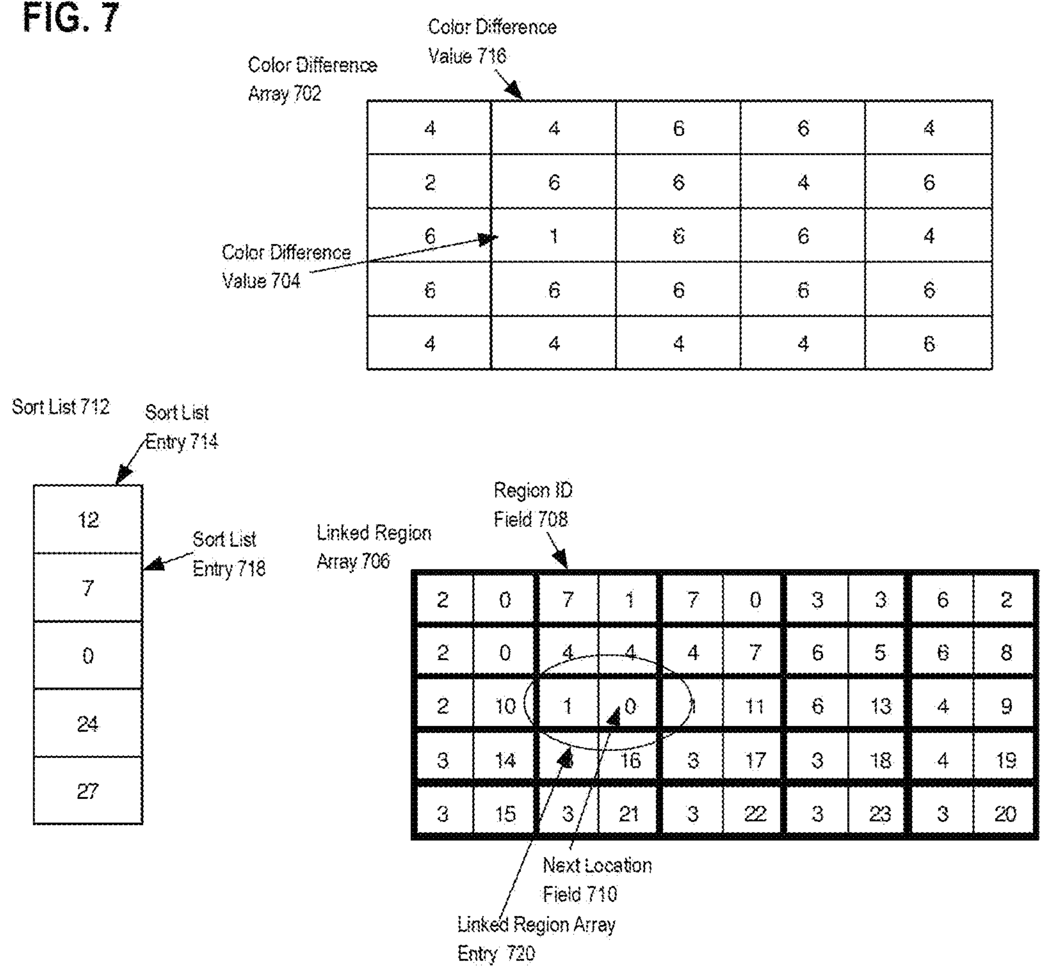
FIG. 7 illustrates example color difference data, which may be used to sort locations based on their associated color difference values and an example sort list and color difference array that may be used which may result from the sorting process.

FIG. 7 illustrates example color difference data, which may be used to sort locations based on their associated color difference values and an example sort list and color difference array that may be used which may result from the sorting process. Sort list 712 and linked region array 706 may be populated based on color difference array 702.

Color difference array 702 identifies the color difference values determined for each location in the input image. Each entry of color difference array 702 corresponds to a particular location of the input image and the value in the entry identifies the color difference value for the corresponding location of the input image.

Sort list 712 may comprise an entry for each color difference value magnitude included in color difference array 702. For example, if the color difference values in color difference array 702 range from 1-5, sort list 712 may comprise five entries. According to an embodiment, after sort list 712 is fully populated, each entry of sort list 712 is associated with a particular magnitude and includes a value that either (1) identifies an image location that is associated with the particular color difference value and/or linked region array entry which corresponds to an image location that is associated with the particular color difference value or (2) indicates that no location of the input image has a color difference value of the particular magnitude (i.e. a value of "0"). For example, sort list entry 714, which is the first entry of sort list 712, may be associated with the color difference value magnitude "1." Sort list entry 714 contains the value "12," which identifies the twelfth location of the linked region array 706, linked region array entry 720, as well as twelfth location of the input image. The twelfth location of the input image is associated with color difference value 704 of "1," as indicated by the color difference value 704 value of "1."

Linked region array 706 may contain an entry for each location of the input image, where each entry corresponds to a particular location. Each entry may include a region ID field and a next location field. After the region ID fields of linked region array 706 are fully populated, each region ID field may contain a value identifying the region to the corresponding locations is assigned. For example, region ID field 708 correspond to the second location of the input image and the value "7" contained in region ID field 708 indicates that the second location of the input image is assigned to region 7. The region ID fields of linked region array 706 may remain empty, or may be initialized to 0 or another value, until the region assignment process occurs.

After the next location fields of linked region array 706 are fully populated according to the sorting process, the value in each particular next location field either (1) identifies another image location that is associated with same color difference value as the input image location associated with the particular "next location" and/or another linked region array entry which corresponds to another location that is associated with same color difference value as the input image location associated with the particular next location field or (2) indicates that there are no further linked region array entries that correspond to image locations having the same color difference value as the input image location to which the particular next location field corresponds.

In an embodiment, image processing system 204 maintains mappings which identify, for each image location, the linked region array entry and color difference array entry that corresponds to the input image location. In another embodiment, the ordering of data in the linked region array 706 and color difference array 702 correspond to the ordering of image locations, such that a single location ID identifies a particular color difference array entry in color difference array 702, a particular linked region array entry in linked region array 706, and a particular image location. For example, the value "12" in sort list entry 714 identifies both the twelfth entry of color difference array 702 and the twelfth entry of linked region array 706, which both correspond to the twelfth location in the input image. The value "12" in sort list entry 714 also identifies the twelfth location in the input image.

Sort list 712 and linked region array 706 may be used during the region assignment process to efficiently locate all image locations that are associated with a particular color difference values and/or their corresponding linked region array entries. The various linked region array entries that correspond to image locations with the same color difference values may be linked via next location fields of the linked region array. Each location associated with a particular color difference value may be efficiently identified by first looking up the sort list entry corresponding to the particular color difference value in sort list 712, which identifies the am image location corresponding to the color difference value. The remaining image locations associated with the particular color difference value may be identified by following the next location fields of linked region array 706, each of which identify the next image location associated with the particular color difference value or the next linked region array location corresponding to the next image location associated with the particular color difference value.

For example, each input image location corresponding to color difference value "1" may be identified by accessing the sort list entry corresponding to the value "1," which is the first entry in sort list 712, sort list entry 714. Sort list entry 714 identifies the first image location corresponding to the color difference value of "1." Since sort list entry 714 contains a value of "12," image processing system 204 may determine that the twelfth location of the input image is associated with a color difference value of "1." The next input image location associated with a color difference value of "1," may be determined by accessing next location field 710, which is the "next location field" corresponding to twelfth location in linked region array 706. Next location field 710 may contain a value, such as "0," which indicates that there are no further locations associated with the color difference value of "1." In another embodiment, the next location field corresponding to the twelfth location may identify another image location associated with the color difference value of "1" or another linked region array entry corresponding to an image location associated with the color difference value of "1."

FIG. 8 illustrates an example process for sorting image locations based on color difference values. The process comprises populating a sort list and linked region array based on a color difference array. The process may be performed by image processing system 204. Image processing system 204 may iterate through the values of a color difference array, each of which are associated with a corresponding image location, and store a location identifier identifying the corresponding image location in either the sort list or linked region array. The sorting may comprise grouping together image locations with the same color difference values, for example by adding the location identifier of a particular location to a list of location identifiers identifying other locations of the same color difference value.

FIG. 9 illustrates the contents of a partially-populated sort list and linked region array which may be populated based on the color difference values stored in a color difference array 702 according to the process illustrated by FIG. 8. Sort lists 902A, 902B and linked region arrays 906A, 906B illustrate different states of the same sort list and linked region array, which are populated based on color difference array 702 and according to the process of FIG. 8. Sort list 902A and linked region array 906A illustrate the sort list and linked region array after a single iteration of the process illustrated in FIG. 7. Sort list 902B and linked region array 906B illustrate the sort list and linked region array after two iterations of the process illustrated in FIG. 8. Prior to initiating the process of FIG. 8, sort list 902A and linked region array may only contain their initialized values. For example, sort list 902A and linked region array 906A may not have contained any values prior to initiating the process of FIG. 4 or may have all contained values of "0."

At block 802, image processing system 204 determines the color difference value for the current location. At the beginning of the process, the current location may be the first location in the input image. The color difference value for the current location may be determined by accessing the value in the color difference array entry corresponding to the current location. In some embodiments, the color difference values in the color difference array are ordered according the ordering of the locations to which the color difference values correspond. For example, the color difference value associated with the first image location maybe the value in the first entry of the color difference array.

Next, at block 804, image processing system 204 determines whether the sort list entry corresponding to the determined color difference value already contains a location ID. Determining whether the sort list entry corresponding to the determined color difference value contains a location ID may comprise determining whether the sort list entry contains a value different than the initialized value. For example, sort list 902A may be initialized to contain values of "0" and determining whether the sort list entry corresponding to the determined color difference value contains a location ID may comprise determining whether the sort list entry contains a non-zero value.

If image processing system 204 determines that the sort list entry corresponding to the determined color difference value does not contain a location ID, the process proceeds to block 806 and the location ID of the current location is stored in the sort list entry corresponding to the determined color difference value. The sort list may not contain a location ID if no location with the same color difference value as the current location was previously considered during the sort list and linked region array population process. For example, during the first iteration of the process, image processing system 204 may determine the color difference value for the first image location by locating the first value in color difference array 502, which is "4." Accordingly, the fourth entry in sort list 902A, sort list entry 904A, may be updated to store the value "1," which is the location ID of the first image location. Sort list entry 904A may previously have contained "0" or some other initialization value.

At block 812, image processing system 204 determines if the current location is the last location of the input image. If the current location is not the last location of the input image, the process proceeds to block 814 and the current location is incremented to be the next location of the input image. For example, after the first iteration of the process is complete, the current location may be incremented to be the second location of the input image and the process of FIG. 8 may repeat with the current location of the input image being the second location of the input image.

At block 802, the color difference value of the new current location may be determined to be "4" by locating color difference value 716 in color difference array 702. At block 804, the process determines whether the sort list entry corresponding to the determined color difference value already contains a location ID. The sort list entry corresponding to the value "4," sort list entry 904A, contains a location ID of "1." Thus, the process proceeds to block 808 because the sort list entry corresponding to the determined color difference value already contains a location ID.

At block 808, the location ID already stored in the sort list entry is moved to the next location field corresponding to the current location in the linked region list. For example, the value "1," which was stored in sort list entry 904A is moved to next location field 908, which is the next location field corresponding to second image location in linked region array 906B. At block 810, the location ID of the current location is stored in the sort list entry corresponding to the determined color difference value in the sort list array. For example, the value "2," which is the location ID of the second location of the input image is stored in the sort list entry corresponding to the color difference value of "4," sort list entry 904B.

At block 812, image processing system 204 determines if the current location is the last location of the input image. If the current location is the last location of the input image, the process ends at block 816. If the current location is not the last location of the input image, the process proceeds to block 814 and the current location is incremented to be the next location of the input image. The process repeats with each location until there are no further image locations to analyze. After the process of FIG. 8 is complete, the sort list and next location fields of the linked region array may be fully populated with location IDs for each location of the input image.

The linked region array and the sort list may be used during the region assignment process to traverse information for each location, where the locations are considered according to an order based on the locations' color difference values. In an embodiment, locations with low color difference values, i.e. locations that are very similar in color to their neighboring locations, are assigned regions before locations with high color difference values. For example, for an image whose determined color difference values range from 1-5, image processing system 204 may first assign regions to each location whose color difference value is 1, followed by region assignments for each image location whose color difference value is 2, and so forth until all locations have been assigned regions.

According to an embodiment, an image location is more likely to be assigned a new region, to which no other image locations have been assigned, if relatively few image locations have been assigned region. For example, if one or more image locations that neighbor the input image location under consideration have already been assigned regions, the region for the input image location under consideration is selected from one of the neighboring regions. If the input image location under consideration only neighbors image locations that have not been assigned region, the input image location may be assigned a new image region to which no image locations have been assigned. According to such a process, the input image locations that are considered for region assignment first may be more likely to be at the center of the determined regions or other non-border locations of the regions. Thus, by assigning region to locations based on their color difference values, locations with low color difference values (i.e. locations that are very similar to their surrounding locations) may be more likely to be at the center of the determined regions or in other non-border locations of the regions. Such an image partitioning approach may cause the resulting partitioned image to be partitioned into regions that are more uniformly-colored than regions determined according to alternate approaches.

FIG. 8 illustrates merely one example process for sorting image locations based on color difference values. In other embodiments, different steps may be performed, the ordering of steps may be changed, certain steps may not occur, or additional steps may occur in addition to the steps illustrated in FIG. 8.

FIG. 10 illustrates an example process for assigning image locations to regions. The process may be performed by image processing system 204. At block 1002, a location of the input image is selected as current location. According to an embodiment, determining a current location comprises accessing either a sort list entry or linked region array entry to determine the first or next image location. During the first iteration of the process of FIG. 10, the first current location may be determined by accessing the sort list entry corresponding to the lowest color difference value magnitude of all found color difference values. The value contained in the sort list entry may identify an image location that has the lowest color difference value of the input image. For example, a first current location may be determined by accessing sort list entry 514 in sort list 512. Based on the location ID “12” contained in sort list entry 514, image processing system 204 may determine that the twelfth location of the input image is the first current location.

At block 1004, the set of regions that neighbor the current location are identified. The set of regions that neighbor the current location include all regions to which one or more location that neighboring the current location are assigned. For example, if a location neighbors four other locations, one of which has been assigned region “1” and two of which have been assigned region “2,” the set of regions that neighbor the current location include “1” and “2.” The particular locations that are considered neighboring locations may vary according to different embodiments. For example, neighboring locations may include all the four locations directly above, below, to the left, and to the right of the current location. In another embodiment, neighboring locations may additionally include the four locations diagonally adjacent to the current locations.

Next, at block 1006, image processing system 204 determines if the number of different neighboring regions equal 0. If so, image processing system 204 performs the action of block 1008, and assigns the current location to a new region, to which no other locations are assigned. If image processing system 204 determines that the number of different neighboring regions do not equal zero, at block 1010, image processing system 204 determines if the number of different neighboring regions equal one. If so, at block 1012, image processing system 204 assigns the current location to the single neighboring region.

If image processing system 204 determines that the number of different neighboring regions do not equal zero or one, image processing system 204 determines, at block 1014, if the number of different neighboring regions equal two. If so, at block 1016, image processing system 204 determines if the two neighboring regions are similar enough to be merged. Determining whether two neighboring regions are similar enough to be merged may comprise comparing a representative color of one region to the representative color of the other region.

According to one embodiment, two colors are similar enough to be merged if the dot product of their difference is less than a particular threshold difference amount. For example, if the representative colors for the two regions are (A,B,C) and (X,Y,Z) the two regions may be merged if Expression 1 is true:

$$((A-X),(B-Y),(C-Z))\cdot((A-X),(B-Y),(C-Z))<\text{Threshold Amount} \quad \text{Expression 1}$$

In some embodiments, the color of the image is represented in three dimensions. For example, color may be expressed using the RGB model comprising a three-dimensional color value. In other embodiments, the colors of the image may be represented in a different number of dimensions. For example, color may be expressed using the four-dimensional CMYK color model. Thus, the processes described herein need not be limited to images whose colors are expressed in a particular dimensionality.

According to various embodiments, the representative color may be the average color of the location assigned to the regions thus far or the color of the first location assigned to the region. The representative color for a region may be determined by accessing a region record for the region that is updated in response to each addition of a new location to the region.

If image processing system 204 determines that the two regions are similar enough to be merged, at block 1022, image processing system 204 merges one region of the two regions into the other region of the two regions. In an embodiment, the region which was discovered later of the two is merged into the region that was discovered earlier of the two.

In an embodiment, assigning a location to a region comprises storing a value identifying the region in an entry of a region list corresponding to the location. The first location that is assigned a region may be assigned a region with a region ID of “1.” The next time a location is to be assigned to a new region that has not previously been assigned any locations, the region ID of “2” may be selected as the region ID of the new region. Thus, each newly assigned region may be associated with a higher numerical value than the regions that have already been assigned to one or more locations. According to such an approach, the newer region of two regions may be identified by comparing the region IDs of the two regions.

In an embodiment where the region which was discovered later of the two is always into the region that was discovered earlier of the two, a particular region may be selected as the region that retains its region ID after the merger based on a comparison of the region ID values identifying the two regions being merged. The region having the region ID of the lower numerical value may be selected as the region that retains its region ID. The other region maybe “merged into”

the selected region by each instance of the region ID in the region list being replaced by the region ID that identifies the selected region.

For example, if two regions are being merged and a first region ID is associated with a region ID of "10" and the other region is associated with a region ID of "14," the region corresponding to the region ID of "14" is merged into the region corresponding to the region ID of "10." Each occurrence of the value of "14" in the region list may be replaced by the value of "10."

In other embodiments, each new region may be assigned a number of increasing value and the region with the higher region ID may be selected as the region that the other region is to be merged into.

In one embodiment, in response to the determination to merge the region of one neighboring location with the region of the other neighboring location, the current location is assigned to the region that is selected to be merged into by the other region ("the selected region"). In an embodiment where assigning a location to a region comprises storing a value identifying the region in an entry of a region list corresponding to the location, a value identifying the selected region is stored in the entry corresponding to the current location. In one embodiment, every other value identifying the non-selected region in the region list is immediately replaced by the value identifying the selected region in response to the determination to merge the two regions. "Immediately" in this context indicates that no other values are considered for region assignment until the values are updated.

In another embodiment, only the entry corresponding to the current location is updated immediately in response to the determination. An indication of which regions were merged into other regions may be stored and the remaining entries in the region list that contain the region IDs identifying the non-selected region are updated to include the region ID identifying the selected region after each location in the image has been assigned a region ID.

In an embodiment where the region with the higher value region ID consistently adopts the region ID of the region with the lower value region ID, or where the opposite is consistently true, the updating of region IDs for merged regions may be completed in a single traversal of the list storing region IDs for each location.

At block 1024, after the two regions are merged, the current location is assigned to the region into which the other region was merged.

If image processing system 204 determines that the two regions are not similar enough to be merged, at block 1018, image processing system 204 assigns the current location to the region most similar in color to the current location based on comparisons of the current location's color and the representative colors for the neighboring regions. In an embodiment, two color difference amounts are calculated, one color difference amount being relative to the color of the current location and the representative color of one region and the other color difference amount being relative to the color of the current location and the representative color of the other region. A color difference amount relative to two colors may be determined by calculating the dot product of the difference between the two colors. The region from which the current location is the least different in terms of color may be identified as the selected region.

Image processing system 204 may proceed to block 1020 if image processing system 204 determines that the number of neighboring regions is not equal to 0, 1, or 2. In such a case, the current location neighbors at least three different regions. At block 1020, image processing system 204 assigns the current location to the region of the set of neighboring regions whose representative color is most similar in color to the current location. Such a region may be identified by calculating a color difference value for each of the three regions, where the divergence value of a region indicates how different the representative color of the region is from the color of the current location. The region with the smallest color difference value may be selected as the region for assignment to which the current location is to be assigned.

After a region has been assigned to the current location, at block 1026, image processing system 204 updates region records for the region assigned to the current location. Region records maintained for a region may identify the first color assigned to the region, the average of the colors assigned to the region, and/or the area of the region.

At block 1028, if there are more locations to consider, the current location may be incremented to be the next sorted location. The next sorted location may be identified, at least in part, by accessing the next location field that corresponds to the current location. For example, if the current location is the twelfth location of the input image, the next location field corresponding to the twelfth location of the input image may identify the next sort location. If all other locations of the same color difference value as the current location in the input image have already been assigned a region, the next location field may contain an initialization value, such as 0. In such a case, the next sorted location may be determined by accessing the sort list entry corresponding to the next higher color difference value magnitude. For example, sort list entry 718 corresponds to the color difference value magnitude of "2" and contains the value "7." Thus, the next sort location may be the seventh location of the input image. For example, if the current location has a color difference value of "1," the next location may be determined by accessing the sort list entry corresponding to a color difference value of "2." If there are no more entries in sort list that have not been considered, there are no more locations to consider and the process of FIG. 10 may end.

FIG. 10 illustrates merely one example process for assigning image locations to regions. In other embodiments, different steps may be performed, the ordering of steps may be changed, certain steps may not occur, or additional steps may occur in addition to the steps illustrated in FIG. 10.

In an embodiment, after the region assignment process has completed, at least some of the location IDs contained in the next locations fields of linked region array 706 field are replaced with different location IDs. Prior to the replacement, the location ID stored in a next location field corresponding to a particular image location may identify another image location or linked region array entry corresponding to another image location, where the other image location is associated with the same color difference value as the particular location. After the replacement, the location ID stored in a next location field corresponding to a particular image location may identify another image location or linked region array entry corresponding to another image location, where the other image location is assigned to the same region as the particular location. That is, after the replacement, the next location fields of the linked region array link to other locations of the same region instead of other locations associated with the same color difference value. Linked region array 1102 is an example linked region array which illustrates the values that may be stored in the linked region array after the modification.

2.4 Alternatives and Extensions

For the purpose of clearly illustrating an example, FIGS. 7, 9, and 11 show individual data structures as described above; however, in various embodiments, each data structure may be implemented as a plurality of data structures. Additionally, in other embodiments, each of the data described herein, such as color difference values, next location information, region IDs, and location IDs, may be stored in any type of data structure, including, but not limited to an array or a linked lists.

Alternative embodiments are described throughout the foregoing description, and in locations that best facilitate understanding the context of the embodiments. Furthermore, the invention has been described with reference to specific embodiments thereof. It will, however, be evident that various modifications and changes may be made thereto without departing from any broader inventive concepts. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

Functional implementation of the various embodiments described herein may be implemented equivalently in hardware, software, firmware, and/or other available functional components or building blocks. No specific limitation is intended to a particular device or programmatic sequence. Other variations and embodiments are possible in light of above teachings.

3. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
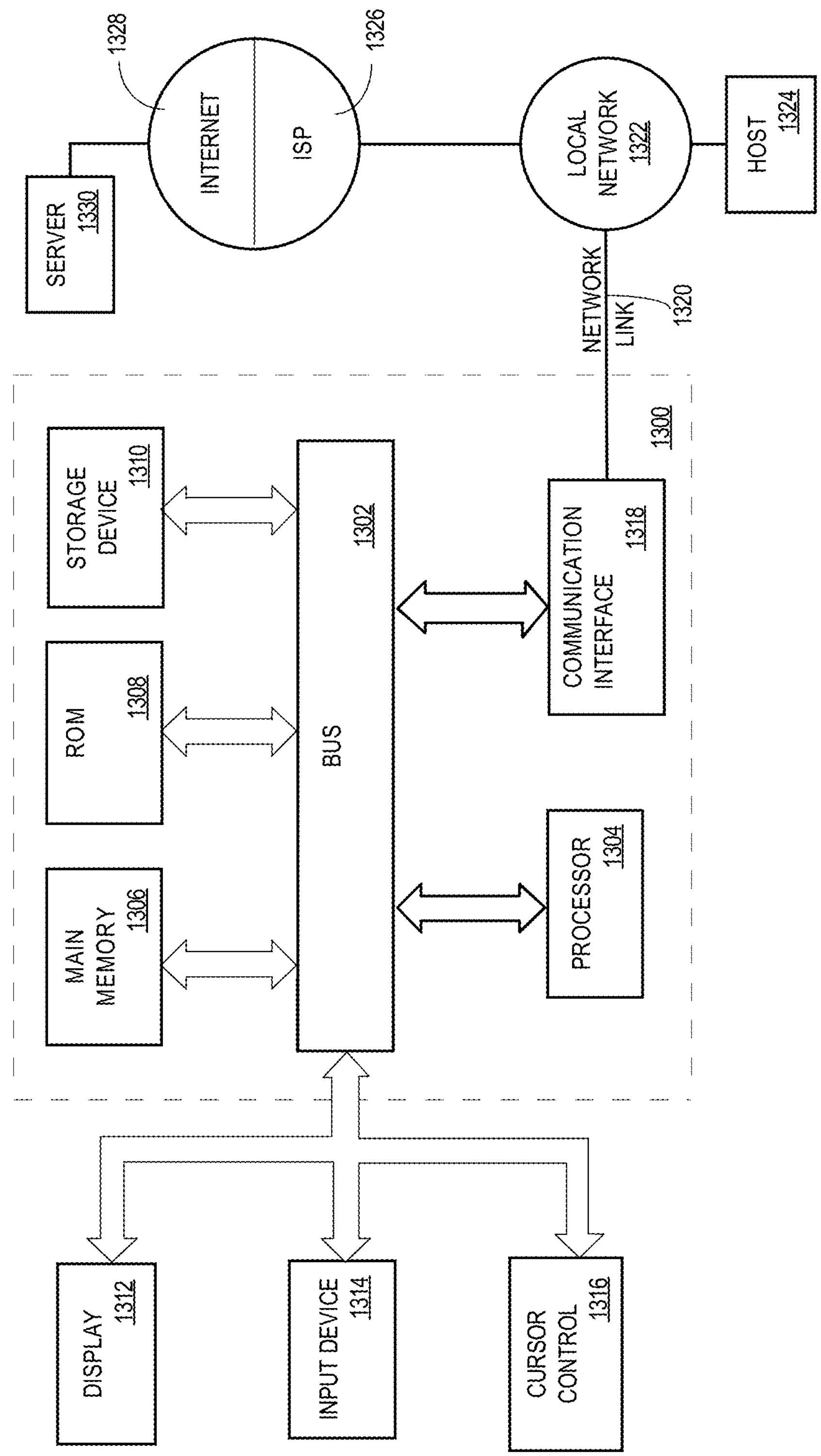
FIG. 13 is a block diagram that illustrates a computer system with which the techniques herein may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term “storage media” as used herein refers to any media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1312 coupled to bus 1302. Communication interface 1312 provides a two-way data communication coupling to a network link 1320 that is connected to a local network 1322. For example, communication interface 1312 may be an integrated services digital network (ISDN) card, cable modem, satellite modem, or a modem to provide a data communication connection to a corresponding type of telephone line. As another example, communication interface 1312 may be a local area network (LAN) card to provide a data communication connection to a compatible LAN. Wireless links may also be implemented. In any such implementation, communication interface 1312 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1312, which carry the digital data to and from computer system 1300, are example forms of transmission media.

Computer system 1300 can send messages and receive data, including program code, through the network(s), network link 1320 and communication interface 1312. In the Internet example, a server 630 might transmit a requested code for an application program through Internet 1328, ISP 1326, local network 1322 and communication interface 1312.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Example Partitioning Instructions

The following is an example set of instructions for partitioning an image into a plurality of regions. At least a portion of the instructions may be included in one embodiment of markup region identification instructions 210.

1. Initialization
   a. Take the ColorImageInput, BucketSortList, LinkedRegionImage and ColorDistanceThreshold as inputs.
   b. Allocate output Objects
      i. aRegionList=new RegionListQ;
      ii. aRegionList.Init( )
   c. Allocate temporary variables
      i. Uint32 array pointer LinkedPixelBuffer
      ii. Uint16 array pointer ColorPixelBuffer
      iii. Uint32 currentPixelIndex
      iv. Uint32 array pointer CurrentLinkedPixel
      v. Uint16array pointer CurrentColorPixel
      vi. Uint32 currentRegionID.
      vii. Uint32 nextRegionID.
      viii. Uint32 aRegionFound
      ix. Uint32 currentRegionFoundCount.
      x. Uint64 minDifference
      xi. Uint64 currentDifference
   d. Set LinkedPixelBuffer=AddressOf(LinkedRegionImage[0][0])
   e. Set ColorPixelBuffer=AddressOff(ColorImageInput[0][0]))
   f. Allocate temporary static arrays
      i. tempRegionRecord Array
      ii. Neighborhood Array
      iii. FoundRegions
         1. FoundCount
            a. Number of regions found
         2. Fields
            a. Uint32 RegionID
         3. Size
            a. Neighborhood.Size
2. For each non zero value, n, in the BucketSortList // traverse the bucket sort list
   a. Set currentPixelIndex=n
   b. While currentPixelIndex !=0 // traverse the linked list in LinkedPixelBuffer
      i. Set CurrentLinkedPixel to LinkedPixelBuffer+currentPixelIndex
      ii. Set CurrentColorPixel to ColorPixelBuffer+(currentPixelIndex*2)
      iii. Set FoundRegions. FoundCount=0
      iv. Set aRegionFound=0
      v. For each element, k, of the NeighboorHood Array
         1. Set currentRegionID=CurrentLinkedPixel[NeighboorHood[k]-1]
         2. If currentRegionID !=0)
            a. currentRegionID=tempRegionRecord[currentRegionID]. RegionTag
            b. For each element, j, of the FoundRegions Array where (j<FoundRegions.FoundCount)
               i. If currentRegionID=FoundRegions[k].RegionID
               1. Set aRegionFound=currentRegionID
               ii. If aRegionFound !=0
               1. Set FoundRegions[FoundRegions.FoundCount]. RegionID=aRegionFound
               2. Increment FoundRegions.FoundCount
      vi. If FoundRegions.FoundCount=0
         1. Set currentRegionID= tempRegionRecord.RegionCount
         2. Copy CurrentColorPixel to tempRegionRecord[currentRegionID].AccumulatedColor
         3. Set tempRegionRecord[currentRegionID].RegionArea=1

4. Set tempRegionRecord[currentRegionID].CalcAverageDone=FALSE
5. Copy CurrentColorPixel to tempRegionRecord [currentRegionID].FirstFoundColor
6. Set tempRegionRecord[currentRegionID].RegionTag=currentRegionID
7. Increment tempRegionRecord.RegionCount
8. Set CurrentLinkedPixel[−1]=currentRegionID.

vii. if FoundRegions.FoundCount=1
1. Set currentRegionID=FoundRegions[0].RegionID
2. Add CurrentColorPixel to tempRegionRecord [currentRegionID].AccumulatedColor
3. Increment tempRegionRecord[tempRegionRecord.RegionCount].RegionArea.
4. Set tempRegionRecord[currentRegionID].CalcAverageDone=FALSE
5. Set CurrentLinkedPixel[−1]=currentRegionID.

viii. If FoundRegions.FoundCount=2
1. Set currentRegionID=FoundRegions[0].RegionID
2. Set nextRegionID=FoundRegions[1].RegionID
3. If currentRegionID>nextRegionID
   a. Swap currentRegionID, nextRegionID
4. UpdateAverageColor(currentRegionID)
5. UpdateAverageColor(nextRegionID)
6. If ColorDifference(tempRegionRecord[currentRegionID].averageColor, tempRegionRecord [nextRegionID].averageColor)<ColorDistanceThreshold
   a. tempRegionRecord[nextRegionID].RegionTag=currentRegionID.
   b. Add tempRegionRecord[nextRegionID].AccumulatedColor to tempRegionRecord[currentRegionID].AccumulatedColor
   c. Add tempRegionRecord[nextRegionID].RegionArea to tempRegionRecord[currentRegionID].RegionArea
   d. Set tempRegionRecord[currentRegionID].CalcAverageDone=FALSE
   e. Set CurrentLinkedPixel[−1]=currentRegionID.
7. Else (set CurrentLinkedPixel region to closest Match)
   a. If (ColorDifference(tempRegionRecord[currentRegionID].averageColor,CurrentColorPixel) <ColorDifference(tempRegionRecord[nextRegionID].averageColor, CurrentColorPixel)
   i. Set CurrentLinkedPixel[−1]=currentRegionID.
   b. Else
   i. Set CurrentLinkedPixel[−1]=nextRegionID.

ix. If FoundRegions.FoundCount>2
1. Set minDifference to hex 0x7fffffffffffff
2. Set currentRegionID=0
3. For (j=0, j<FoundRegions.FoundCount, j=j+1)
   a. currentDifference=ColorDifference(tempRegionRecord[j].averageColor, CurrentColorPixel)
   b. if (currentDifference<minDifference)
   i. Set minDifference=currentDifference
   ii. Set currentRegionID=j
4. If (currentRegionID !=0)
   a. Set CurrentLinkedPixel[−1]=currentRegionID
   c. Set currentPixelIndex=CurrentLinkedPixel[0]

3. For each record, n, in tempRegionRecord, where n is Less than tempRegionRecord.RegionCount
   a. If tempRegionRecord[n].RegionTag=n // this region is the root of the merged regions
   i. tempRegionRecord[n].RegionTag=aRegionList.AddElement(tempRegionRecord[n].FirstFoundColor, tempRegionRecord[n].RegionArea, 0) // create an output region for this one
   b. Else // this is not a root region
   i. tempRegionRecord[n].RegionTag=tempRegionRecord[tempRegionRecord[n].RegionTag].RegionTag // set tag to the output region index
4. For Each Pixel, CurrentLinkedPixel, in LinkedPixelBuffer
   a. Increment currentPixelIndex to the offset for CurrentLinkedPixel
   b. currentRegionID=tempRegionRecord[CurrentLinkedPixel.regionLabelIndex].RegionTag
   c. CurrentLinkedPixel.regionLabelIndex=currentRegionID // set tag to the output region index
   d. CurrentLinkedPixel.nextSortIndex=aRegionList [currentRegionID].pixelListOffset
   e. aRegionList [currentRegionID].pixelListOffset=currentPixelIndex+1
5. Output the modified LinkedRegionImage and aRegionList,

What is claimed is:

1. A computer-implemented method, comprising:

using the one or more computing devices, partitioning an input image of a customizable product into a plurality of image regions based on color and color differences of pixels of the input image and generating region information that specifies how the input image is partitioned into the plurality of image regions;

based at least in part on the region information that specifies how the input image is partitioned into the plurality of image regions, determining data that represents at least a particular portion of a markup in the input image;

wherein the data that represents at least the particular portion of the markup in the input image comprises information about a set of image locations that are within the particular portion of the markup, and indicates a color of the particular portion of the markup embellished in the input image;

based at least in part on the data, determining rendering instructions for rendering a computer-generated visualization of the customizable product; and sending the rendering instructions for rendering the computer-generated visualization of a customizable product to a web server;

storing, in data structures in computer memory, information describing the plurality of image regions, the data structures including a first data structure which identifies, for each image region of the plurality of image regions: a representative color value identifying a color that represents the image region; a size of the image region; or a single location assigned to the image region.

2. The computer-implemented method of claim 1, wherein the input image comprises a digital image photograph of the customizable product; wherein the digital image photograph comprises the markup.

3. The computer-implemented method of claim 1, further comprising:

removing luminance information from the input image before partitioning the input image into the plurality of image regions; and wherein the data that represents at least the particular portion of the markup in the input image is determined based on a region array and a region list included in the information that specifies how the input image is partitioned into the plurality of image regions.

4. The computer-implemented method of claim 1, further comprising:

assigning a color difference value to each location of a plurality of locations within the input image, wherein a particular color difference value assigned to a particular location is determined based in part on the input image and indicates how different a color of the particular location is from colors of other locations neighboring the particular location;

assigning each location of the plurality of locations to an image region of the plurality of image regions according to a particular order, wherein the particular order is based at least in part on color difference values associated with the plurality of locations;

selecting a particular image region for assignment to the particular location based in part on the color of the particular location, wherein the color of the particular location is determined based at least in part on the input image.

5. The computer-implemented method of claim 1, further comprising:

determining that a first location adjacent to a certain location is assigned to a first region and a second location adjacent to the certain location is assigned to a second region different from the first location; and assigning the certain location to a selected region of the first region and the second region based on determining that a color of the certain location is more similar to a color representing the selected region than a color representing a non-selected region of the first region and the second region.

6. The computer-implemented method of claim 1, further comprising:

determining that a certain adjacent location is the only location, of a plurality of locations adjacent to a certain location, that has been assigned a region; and in response to the determination, assigning the certain location to a region assigned to the certain adjacent location.

7. The computer-implemented method of claim 1, further comprising:

determining that a first location adjacent to a certain location is assigned to a first region and a second location adjacent to the certain location is assigned to a second region different from the first location; and determining whether to merge the first region and the second region, wherein the determining whether to merge the first region and the second region comprises comparing a color representing the first region with a color representing the second region.

8. The computer-implemented method of claim 1, wherein the data structures include a second data structure comprising a plurality of entries, each entry of the plurality of entries representing a single corresponding location of a plurality of locations and identifies either a corresponding next location relative to the corresponding location, wherein the next location relative to the corresponding location is a location different than the corresponding location and is assigned to the same image region as the corresponding location; or a value indicating that there is no next location relative to the corresponding location.

9. The computer-implemented method of claim 8, further comprising:

determining which regions are assigned to locations adjacent to a certain location of the plurality of locations; and assigning the certain location to a certain image region of the plurality of image regions based, in part, on the regions that are assigned to the locations adjacent to the certain location.

10. A computer system comprising:

one or more processors;

a non-transitory computer-readable storage medium storing one or more sequences of instructions which, when executed by the one or more processors, cause the one or more processors to perform:

using the one or more computing devices, partitioning an input image of a customizable product into a plurality of image regions based on color and color differences of pixels of the input image and generating region information that specifies how the input image is partitioned into the plurality of image regions;

based at least in part on the region information that specifies how the input image is partitioned into the plurality of image regions, determining data that represents at least a particular portion of a markup in the input image;

wherein the data that represents at least the particular portion of the markup in the input image comprises information about a set of image locations that are within the particular portion of the markup, and indicates a color of the particular portion of the markup embellished in the input image;

based at least in part on the data, determining rendering instructions for rendering a computer-generated visualization of the customizable product; and sending the rendering instructions for rendering the computer-generated visualization of a customizable product to a web server;

storing, in data structures in computer memory, information describing the plurality of image regions, the data structures including a first data structure which identifies, for each image region of the plurality of image regions: a representative color value identifying a color that represents the image region; a size of the image region; or a single location assigned to the image region.

11. The computer system of claim 10, wherein the input image comprises a digital image photograph of the customizable product; wherein the digital image photograph comprises the markup.

12. The computer system of claim 10, wherein the storage medium stores additional instructions which, when executed by the one or more processors, cause the one or more processors to perform:

removing luminance information from the input image before partitioning the input image into the plurality of image regions; and wherein the data that represents at least the particular portion of the markup in the input image is determined based on a region array and a region list included in the information that specifies how the input image is partitioned into the plurality of image regions.

13. The computer system of claim 10, wherein the storage medium stores additional instructions which, when executed by the one or more processors, cause the one or more processors to perform:

assigning a color difference value to each location of a plurality of locations within the input image, wherein a particular color difference value assigned to a particular location is determined based in part on the input image and indicates how different a color of the particular location is from colors of other locations neighboring the particular location;

assigning each location of the plurality of locations to an image region of the plurality of image region according to a particular order, wherein the particular order is based at least in part on color difference values associated with the plurality of locations; and selecting a particular image region for assignment to the particular location based in part on the color of the particular location, wherein the color of the particular location is determined based at least in part on the input image.

14. The computer system of claim 10, wherein the storage medium stores additional instructions which, when executed by the one or more processors, cause the one or more processors to perform:

determining that a first location adjacent to a certain location is assigned to a first region and a second location adjacent to the certain location is assigned to a second region different from the first location; and assigning the certain location to a selected region of the first region and the second region based on determining that a color of the certain location is more similar to a color representing the selected region than a color representing a non-selected region of the first region and the second region.

15. The computer system of claim 10, wherein the storage medium stores additional instructions which, when executed by the one or more processors, cause the one or more processors to perform:

determining that a certain adjacent location is the only location, of a plurality of locations adjacent to a certain location, that has been assigned a region; and in response to the determination, assigning the certain location to a region assigned to the certain adjacent location.

16. The computer system of claim 10, wherein the storage medium stores additional instructions which, when executed by the one or more processors, cause the one or more processors to perform:

determining that a first location adjacent to a certain location is assigned to a first region and a second location adjacent to the certain location is assigned to a second region different from the first location; and determining whether to merge the first region and the second region, wherein the determining whether to merge the first region and the second region comprises comparing a color representing the first region with a color representing the second region.

17. The computer system of claim 10, wherein the data structures include a second data structure comprising a plurality of entries, wherein each entry of the plurality of entries represents a single corresponding location of a plurality of locations and identifies either a corresponding next location relative to the corresponding location, wherein the next location relative to the corresponding location is a location different than the corresponding location and is assigned to the same image region as the corresponding location; or a value indicating that there is no next location relative to the corresponding location.

18. The computer system of claim 17, wherein the storage medium stores additional instructions which, when executed by the one or more processors, cause the one or more processors to perform:

determining which regions are assigned to locations adjacent to a certain location of the plurality of locations; and assigning the certain location to a certain image region of the plurality of image regions based, in part, on the regions that are assigned to the locations adjacent to the certain location.

* * * * *